(12) United States Patent
Bulea

(10) Patent No.: US 8,531,433 B2
(45) Date of Patent: Sep. 10, 2013

(54) PRODUCING CAPACITIVE IMAGES COMPRISING NON-CONNECTION VALUES

(75) Inventor: Mihai M. Bulea, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 240 days.

(21) Appl. No.: 13/184,309

(22) Filed: Jul. 15, 2011

(65) Prior Publication Data

US 2012/0019478 A1    Jan. 26, 2012

Related U.S. Application Data

(60) Provisional application No. 61/366,509, filed on Jul. 21, 2010, provisional application No. 61/373,570, filed on Aug. 13, 2010.

(51) Int. Cl.
    *G06F 3/045*      (2006.01)

(52) U.S. Cl.
    USPC .......................................................... 345/174

(58) Field of Classification Search
    USPC .......... 345/174, 173, 156; 324/690; 382/124
    See application file for complete search history.

(56) References Cited

U.S. PATENT DOCUMENTS

| | | | |
|---|---|---|---|
| 4,242,676 A * | 12/1980 | Piguet et al. .................. | 345/174 |
| 4,476,463 A | 10/1984 | Ng et al. | |
| 4,623,757 A | 11/1986 | Marino | |
| 5,283,559 A | 2/1994 | Kalendra et al. | |
| 5,537,048 A * | 7/1996 | Novak .......................... | 324/690 |
| 5,847,690 A | 12/1998 | Boie et al. | |
| 6,177,918 B1 | 1/2001 | Colgan et al. | |
| 6,714,666 B1 * | 3/2004 | Morimura et al. ............ | 382/124 |
| 7,148,704 B2 | 12/2006 | Philipp | |
| 7,463,246 B2 | 12/2008 | Mackey | |
| 7,825,905 B2 | 11/2010 | Philipp | |
| 7,918,019 B2 | 4/2011 | Chang et al. | |
| 7,920,129 B2 | 4/2011 | Hotelling et al. | |
| 7,932,897 B2 * | 4/2011 | Elias et al. .................... | 345/174 |
| 7,973,771 B2 * | 7/2011 | Geaghan ....................... | 345/173 |
| 8,350,826 B2 * | 1/2013 | Watanabe ..................... | 345/174 |

(Continued)

FOREIGN PATENT DOCUMENTS

KR    10-2009-0107640      10/2009

OTHER PUBLICATIONS

ISA/KR, International Search Report and Written Opinion for International Application No. PCT/US2011/044280, 8 pages, Feb. 17, 2012.

(Continued)

*Primary Examiner* — Fred Tzeng

(57) ABSTRACT

Apparatus and method for producing capacitive images of a sensing region of a sensor electrode are disclosed. The sensor electrode comprises a plurality of connection sections and a non-connection section. The sensor electrode is connected to sensor circuitry at a plurality of connection locations located in the plurality of connection sections and not the non-connection section. The apparatus is operated by transmitting a transmitter signal into the sensor electrode at a connection location of the plurality of connection locations, receiving a plurality of resulting signals from the sensor electrode at multiple connection locations of the plurality of connection locations, and producing a capacitive image using the plurality of resulting signals. The plurality of resulting signals includes effects of the transmitter signal propagating through the sensor electrode to the multiple connection locations. The capacitive image comprising a non-connection value associated with the non-connection section.

27 Claims, 13 Drawing Sheets

(56) References Cited

U.S. PATENT DOCUMENTS

| | | | |
|---|---|---|---|
| 8,395,594 B2* | 3/2013 | Karhiniemi | 345/173 |
| 2001/0026635 A1 | 10/2001 | Jung | |
| 2005/0041018 A1 | 2/2005 | Philipp | |
| 2007/0247443 A1 | 10/2007 | Philipp | |
| 2008/0062148 A1 | 3/2008 | Hotelling et al. | |
| 2009/0033636 A1* | 2/2009 | Toyota et al. | 345/174 |
| 2009/0085894 A1 | 4/2009 | Ghandhi et al. | |
| 2009/0159344 A1 | 6/2009 | Hotelling et al. | |
| 2009/0277696 A1 | 11/2009 | Reynolds et al. | |
| 2010/0253645 A1* | 10/2010 | Bolender | 345/174 |
| 2010/0265208 A1* | 10/2010 | Kim et al. | 345/174 |
| 2010/0271330 A1 | 10/2010 | Philipp | |
| 2010/0292945 A1* | 11/2010 | Reynolds et al. | 702/65 |
| 2010/0328228 A1 | 12/2010 | Elias | |
| 2011/0001717 A1 | 1/2011 | Hayes et al. | |
| 2011/0025636 A1* | 2/2011 | Ryu et al. | 345/173 |
| 2011/0030209 A1 | 2/2011 | Chang et al. | |
| 2011/0043482 A1 | 2/2011 | Philipp | |
| 2011/0057670 A1 | 3/2011 | Jordan | |
| 2011/0062969 A1 | 3/2011 | Hargreaves et al. | |
| 2011/0080355 A1 | 4/2011 | Gruner et al. | |
| 2011/0122079 A1* | 5/2011 | Shih et al. | 345/173 |
| 2011/0134073 A1* | 6/2011 | Ahn | 345/174 |
| 2011/0187672 A1* | 8/2011 | Hung et al. | 345/174 |
| 2011/0227858 A1* | 9/2011 | An et al. | 345/174 |
| 2011/0279400 A1* | 11/2011 | Yilmaz | 345/174 |
| 2012/0262385 A1* | 10/2012 | Kim et al. | 345/173 |
| 2012/0313861 A1* | 12/2012 | Sumi et al. | 345/173 |

OTHER PUBLICATIONS

Barrett, Gary et al., "Projected-Capacitive Touch Technology", *Information Display 3/10*, (2010), 16-21.

3M™, "3M™ Unpatterned Transparent Conductor 8853", http://multimedia.3m.com/mws/mediawebserver?mwsId=SSSSSu7zK1fslxtUOY1Nx__vev7qe17zHvTSevTSeSSSSSS--&fn=UnpattTranspConductors8853.pdf, (2011), 1-2.

Ko, Seunghoon et al., "Low Noise Capacitive Sensor for Multi-Touch Mobile Handset's Applications" *Solid State Circuits Conference (A-SSCC) 2010 IEEE Asian*, (Feb. 22, 2011), 1-4.

Kim, Hong-Ki et al., "Capacitive Tactile Sensor Array for Touch Screen Application", *Sensors and Actuators A: Physical*, (Jan. 2011), 2-7, vol. 165, Issue 1.

\* cited by examiner

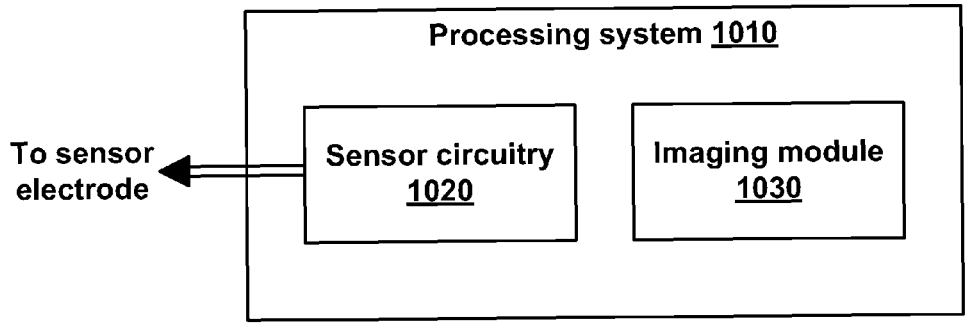

TRANSMITTING A TRANSMITTER SIGNAL INTO A SENSOR ELECTRODE AT A CONNECTION LOCATION OF A PLURALITY OF CONNECTION LOCATIONS
1110

RECEIVING A PLURALITY OF RESULTING SIGNALS FROM THE SENSOR ELECTRODE AT MULTIPLE CONNECTION LOCATIONS OF THE PLURALITY OF CONNECTION LOCATIONS
1120

PRODUCING A CAPACITIVE IMAGE USING THE PLURALITY OF RESULTING SIGNALS, THE CAPACITIVE IMAGE COMPRISING A NON-CONNECTION VALUE
1130

```
DURING A FIRST TIME PERIOD, OPERATING A FIRST CIRCUITRY
PORTION OF THE PLURALITY OF CIRCUITRY PORTIONS TO TRANSMIT A
FIRST TRANSMITTER SIGNAL INTO A SENSOR ELECTRODE AND
OPERATING THE PLURALITY OF CIRCUITRY PORTIONS TO RECEIVE A
FIRST PLURALITY OF RESULTING SIGNALS FROM THE SENSOR
ELECTRODE
1210
```

```
DURING A SECOND TIME PERIOD, OPERATING A SECOND CIRCUITRY
PORTION OF THE PLURALITY OF CIRCUITRY PORTIONS TO TRANSMIT A
SECOND TRANSMITTER SIGNAL INTO THE SENSOR ELECTRODE AND
OPERATING THE PLURALITY OF CIRCUITRY PORTIONS TO RECEIVE A
SECOND PLURALITY OF RESULTING SIGNALS FROM THE SENSOR
ELECTRODE
1220
```

```
PRODUCING A CAPACITIVE IMAGE USING SAID FIRST AND SECOND
PLURALITIES OF RESULTING SIGNALS
1230
```

PRODUCING CAPACITIVE IMAGES COMPRISING NON-CONNECTION VALUES

CROSS REFERENCE TO RELATED APPLICATIONS

This application claims priority to and benefit of U.S. provisional patent application 61/366,509, entitled "IMAGING SENSOR WITH AN UN-PATTERNED CONDUCTIVE LAYER" with filing date Jul. 21, 2010, assigned to the assignee of the present non-provisional application.

This application claims priority to and benefit of U.S. provisional patent application 61/373,570, entitled "IMAGING SENSOR WITH UN-PATTERNED CONDUCTIVE LAYER" with filing date Aug. 13, 2010, assigned to the assignee of the present non-provisional application.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

A conventional imaging capacitive proximity sensor device is typically rectangular, and configured to provide capacitive images comprising pixel values for a set of capacitive pixels. The set of capacitive pixels generally corresponds to equal-sized parts of the sensing region. These parts are usually uniformly spaced when projected onto the input surface of the capacitive proximity sensor device. Thus, the capacitive pixels are typically rectangular, laid out in a rectilinear fashion, and span a rectangular region. In this way, the relationship between the capacitive image to its capacitive pixels is similar to the relationship between a display image and the display pixels.

SUMMARY

Apparatus and method for producing capacitive images of a sensing region of a sensor electrode are disclosed. In one embodiment, the sensor electrode comprises a plurality of connection sections and a non-connection section. The sensor electrode is connected to sensor circuitry at a plurality of connection locations located in the plurality of connection sections and not the non-connection section. The apparatus is operated by transmitting a transmitter signal into the sensor electrode at a connection location of the plurality of connection locations, receiving a plurality of resulting signals from the sensor electrode at multiple connection locations of the plurality of connection locations, and producing a capacitive image using the plurality of resulting signals. The plurality of resulting signals includes effects of the transmitter signal propagating through the sensor electrode to the multiple connection locations. The capacitive image comprising a non-connection value associated with the non-connection section.

BRIEF DESCRIPTION OF DRAWINGS

The drawings referred to in this Brief Description of Drawings should not be understood as being drawn to scale unless specifically noted. The drawings illustrate various embodiments of the present invention and, together with the Description of Embodiments, serve to explain principles discussed below, where like designations denote like elements, and:

FIG. 10 is a block diagram of an example processing system 1010, in accordance with embodiments of the invention;

FIGS. 11-12 are flow charts illustrating methods for producing capacitive images of a sensing region of a sensor electrode, in accordance with embodiments of the invention;

DESCRIPTION OF EMBODIMENTS

The following Description of Embodiments is merely provided by way of example and not of limitation. Furthermore, there is no intention to be bound by any expressed or implied theory presented in the preceding technical field, background, brief summary or the following detailed description.

Various embodiments of the present invention provide input devices and methods that provide capacitive images including pixel values for capacitive pixels that are not directly measured. Some embodiments of this invention provide capacitive imaging capability using un-patterned material in non-patterned sensor electrodes. The imaging capability may span one, two, or higher numbers of dimensions. Using un-patterned material to support part or all of a sensing region can offer advantages such as less complex sensor design, less complex sensor manufacture, lower costs, and increased sensor reliability.

Figure 1:
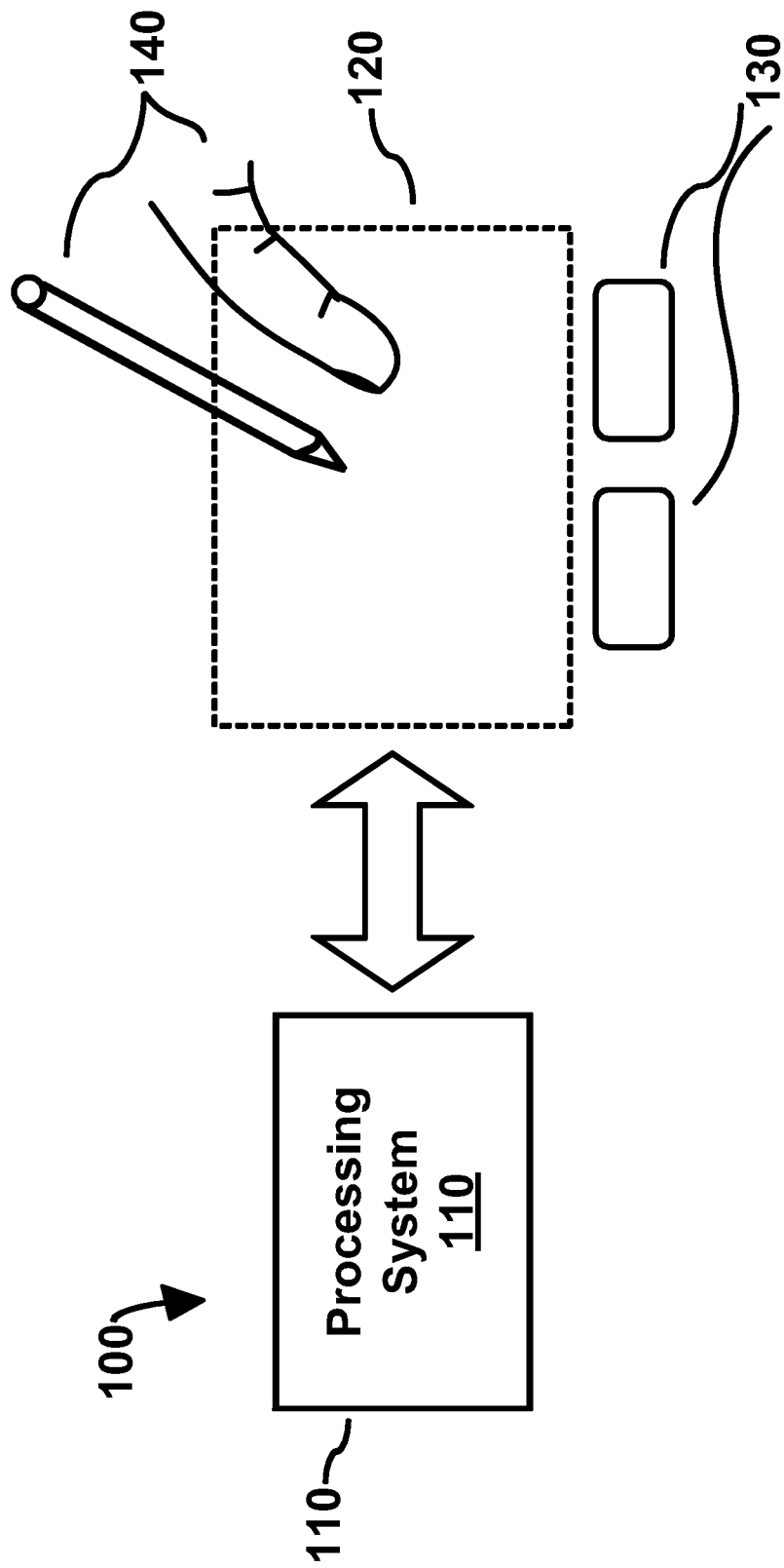
FIG. 1 is a block diagram of an example input device, in accordance with embodiments of the invention.

Turning now to the figures, FIG. 1 is a block diagram of an exemplary input device 100, in accordance with embodiments of the invention. Input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include I²C, PS/2, Serial Peripheral Interface (SPI), Universal Serial Bus (USB), Bluetooth, Radio Frequency (RF), and Infrared.

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100 in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g. a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As several non-limiting examples, input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, this changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as Graphical User Interface (GUI) actions such as cursor movement, selection, menu navigation, and other functions. In some embodiments, processing system 110 provides information about the input (or lack of input) to some part of the electronic system (e.g. to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 comprises a touch screen interface, and sensing region 120 overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
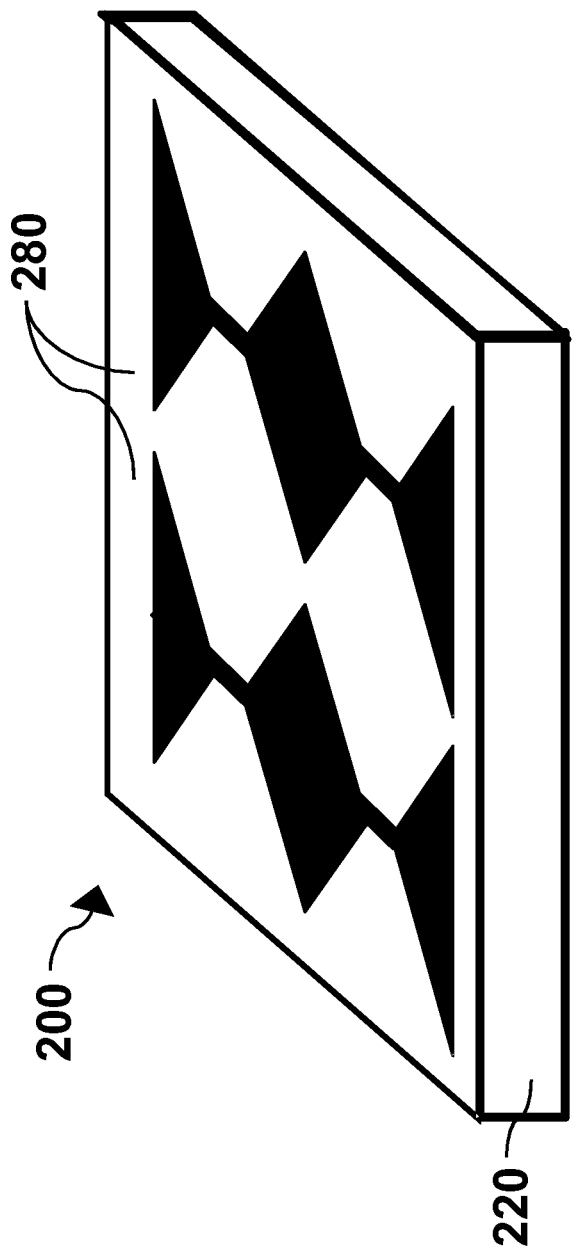
FIG. 2 is a quasi-isometric view of a portion of a capacitive sensor device 200, in accordance with embodiments of the invention.

FIG. 2 shows a quasi-isometric view of a portion of a capacitive sensor device 200, in accordance with embodiments of the invention. Specifically, FIG. 2 shows a substrate 220, on which a sensor pattern is disposed. The sensor pattern comprises two patterned sensor electrodes 280 formed from conductive material. Sensor electrodes 280 each comprise a shape of linked diamonds formed using one or more electrode patterning processes. That is, sensor electrodes 280 may be formed using one or more selective deposition and/or selective removal processes. The patterning of sensor electrodes 280 does not cut through the underlying substrate 220, and may not cut substrate 220 at all. Thus, substrate 220 has a different shape underlying at least part of sensor electrodes 280.

Selective deposition processes deposit material in certain areas, and not in other areas, according to a desired pattern. Printing is an example of a selective deposition process. Any appropriate conductive material may be selectively deposited to form sensor electrodes 280, including carbon ink, silver ink, etc. Selective removal processes remove material from certain areas, and not in other areas, according to a desired pattern. Etching is an example of a selective removal process. Any appropriate conductive material may be selectively removed to form sensor electrodes 280, including metals such as copper, metal oxides such as ITO (indium tin oxide), etc.

Figure 3:
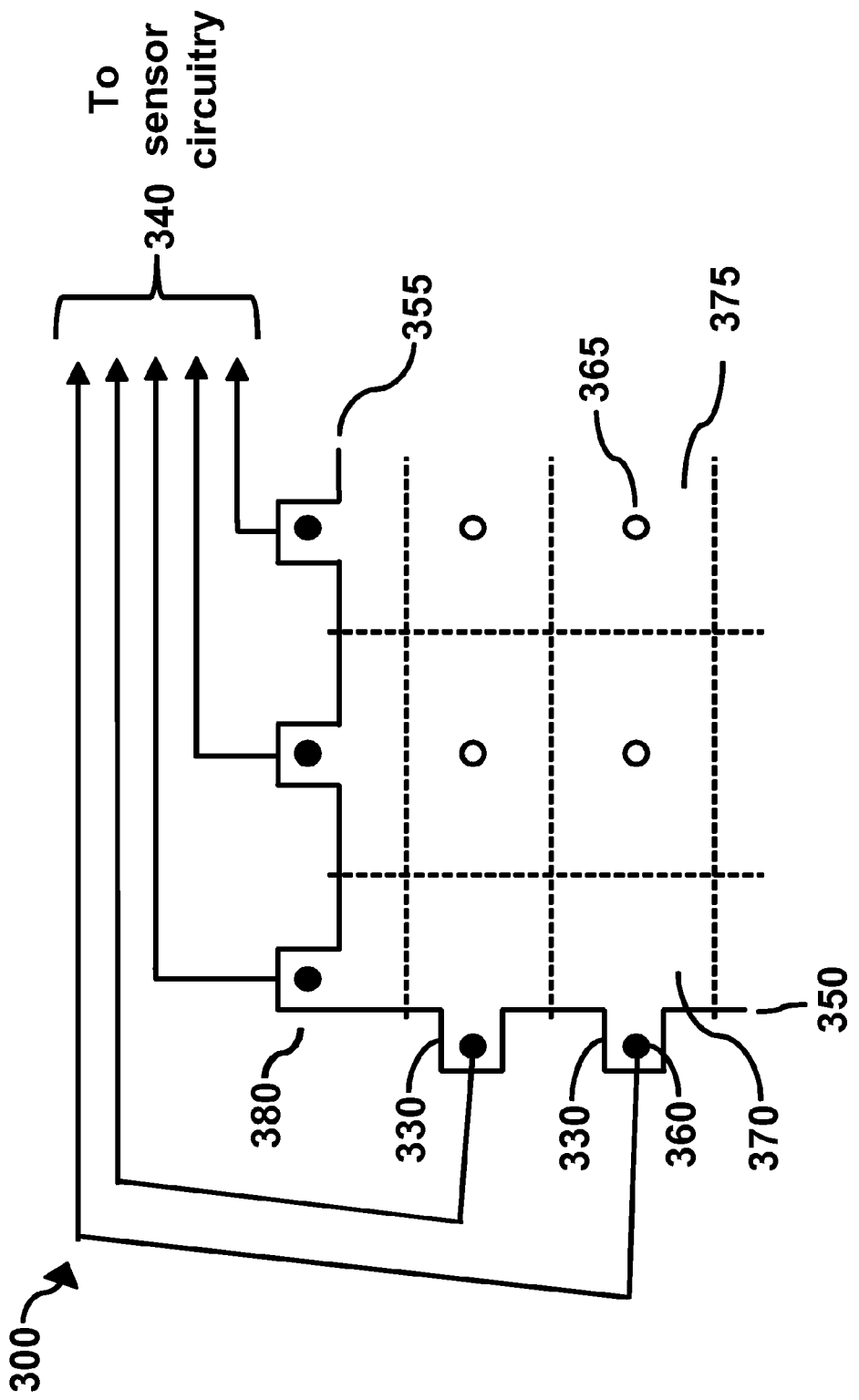
FIG. 3 is a top view of a part of a capacitive sensor device 300, in accordance with embodiments of the invention.

FIG. 3 shows a top view of a part of a capacitive sensor device 300, in accordance with embodiments of the invention. Specifically, FIG. 3 shows a non-patterned sensor electrode 380 disposed on a substrate (not shown). The sensor electrode and its underlying substrate have been cut completely through to produce an overall shape of a series of squares shapes 330 located along two edges 350 and 355. Thus, the underlying substrate has a same shape as sensor electrode 380 along edges 350, 355. Thus, sensor electrode 380 is considered non-patterned as its shape is not formed from an electrode patterning process.

Sensor electrode 380 is connected to sensor circuitry at connection locations 360 located in square shapes 330 via routing traces 340. In some embodiments, the connection may be direct. For example, the connection may comprise a wire bond from a connection location 360 directly to a bonding pad of an integrated circuit, or IC. In some embodiments, the connection may be more indirect. For example, the connection may comprise one or more routing traces 340. As another example, the connection may comprise one or more layers of additional conductive material. This additional conductive material may be more conductive than the material of the sensor electrode and make the resistance in square shape 330 negligible during operation (for example, the additional conductive material(s) may comprise silver ink and the sensor electrode may comprise ITO). The additional conductive material(s) may also have characteristics that help facilitate the connection (for example, the additional conductive material(s) may comprise silver ink that is easier to solder.

Sensor electrode 380 may be abstractedly divided into different sections in various ways. These sections correspond to the capacitive pixels of the capacitive image for which sensor device 300 is configured. A section generally matches its corresponding capacitive pixel in size, shape, and location, although that need not be the case. FIG. 3 shows an example division using dashed lines. With this division, the connection section 370 is termed a "connection section" because it includes a connection location 360 at which sensor circuitry is connected. The connection locations are indicated with closed circles in FIG. 3. Connection locations (e.g. connection location 360) often coincide with the electrical nodes of electrical models of their sensor electrodes (e.g. the sensor electrode 380). Connection locations (e.g. connection location 360) may also coincide with the centers of their corresponding capacitive pixels.

The non-connection section 375 is termed a "non-connection section" because it does not include any connection locations at which sensor circuitry are connected. The center 365 of non-connection section 375 is indicated with an open circle, as are the other centers of the non-connection sections shown in FIG. 3. The centers of non-connection sections (e.g. center 365) may coincide with electrical nodes of electrical models of their sensor electrodes (e.g. sensor electrode 380). The centers of non-connection mentions/e.g. center 365) may also coincide with the centers of their corresponding capacitive pixels. Sensor electrode 380 may be used to provide capacitive images including capacitive pixels corresponding to non-connection sections, and thus provide imaging capability using the un-patterned material of sensor electrode 380.

In electrical models of sensor electrodes, electrical nodes located along a boundary of the electrical model of a sensor electrode may be termed "boundary nodes," and electrical nodes located within the boundary of the electrical model may be termed "internal nodes."

FIGS. 2 and 3 and the associated discussion illustrate specific examples of materials, processes, configurations, shapes, sizes, numbers and spacing of connection locations, and the like. These are meant to be illustrative, and not limiting, such that various embodiments may differ in any number of ways. For example, various embodiments may comprise sensor electrodes formed from various single materials or combinations of materials. As specific example, some sensor electrodes may comprise homogeneous materials such as metals (e.g. copper), metal oxides (e.g. indium tin oxide (ITO) or antimony zinc oxide (ATO)), conductive polymers (e.g. Poly(3,4-ethylenedioxythiophene) poly(styrene-sulfonate), or PEDOT:PSS), etc. As further specific examples, some sensor electrodes may comprise non-homogeneous materials such as structured conductors (e.g. metal mesh, nanofibers of silver or another conductor, carbon nanotubes, or graphene).

As another example of variations, some embodiments may comprise sensor electrodes having substantially uniform thicknesses and/or resistance per square, and other embodiments may be non-uniform in one or both of these respects. As a further example of variations, some embodiments may comprise substantially transparent sensor electrodes through which visual displays may be viewed without deleterious obstruction, and some embodiments may comprise sensor electrodes through which visual displays may not be viewed without deleterious obstruction. The visual displays may be static or dynamic, and may be produced on a display screen that is integral to or separate from the respective sensor device.

The rest of the figures and discussions further illustrate the variations possible. Although various embodiments may have different configurations, the discussions above may be applied to the other examples illustrated in this document. For clarity of explanation, the rest of the figures generally do not show details such as analogs to square shapes 330, analogs to routing traces 340, and the like. For example, FIGS. 4-7 show a rectangular sensor electrode 480 as a simple square, and some embodiments in accordance with FIGS. 4-7 may have extensions analogous to square shapes 330 or other details.

Many proximity sensor devices (including touch screen devices) are rectilinear in shape. In many cases, the plurality of connection and non-connection sections regularly tile on the rectilinear shape, and the pixel layout matches a rectilinear grid. This configuration may be useful, since many displays that are used with these devices are rectangular. Also, a sensor electrode for such a system may be readily fabricated as a sheet of rectangular, conductive material.

Figure 4:
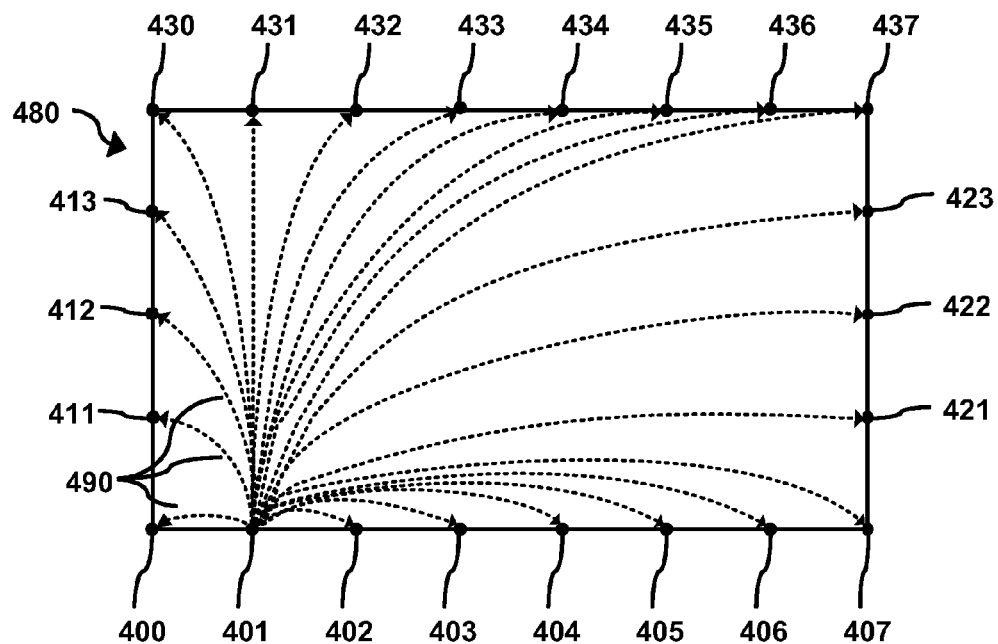
FIGS. 4-7 are top views of a rectangular sensor electrode in operation, in accordance with embodiments of the invention.
Figure 5:
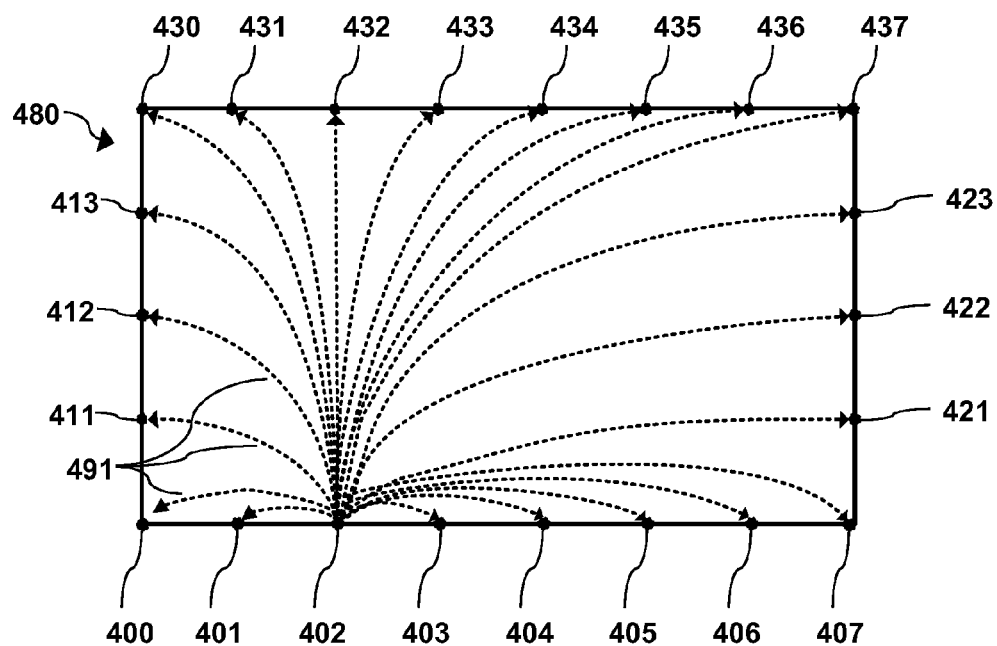
Figure 6:
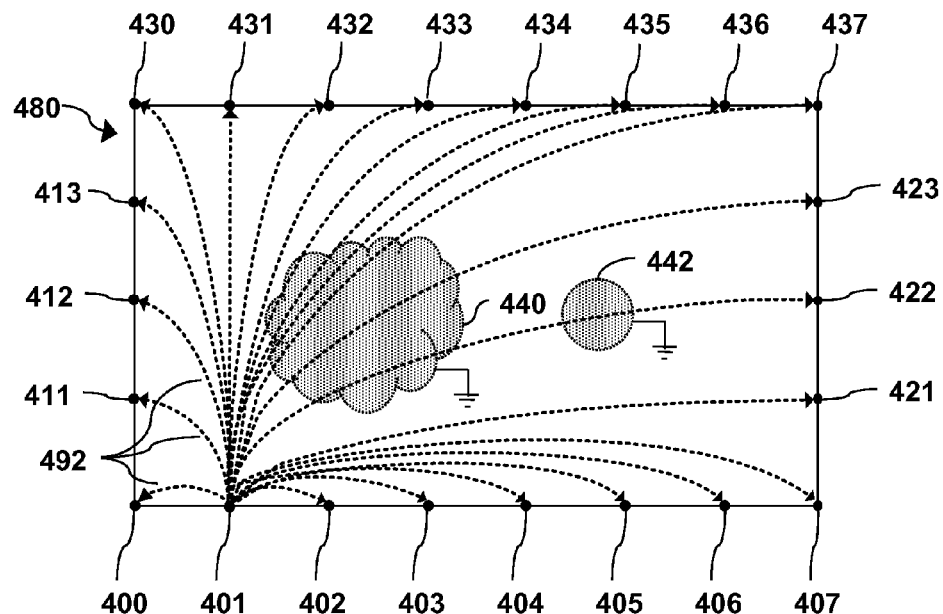
Figure 7:
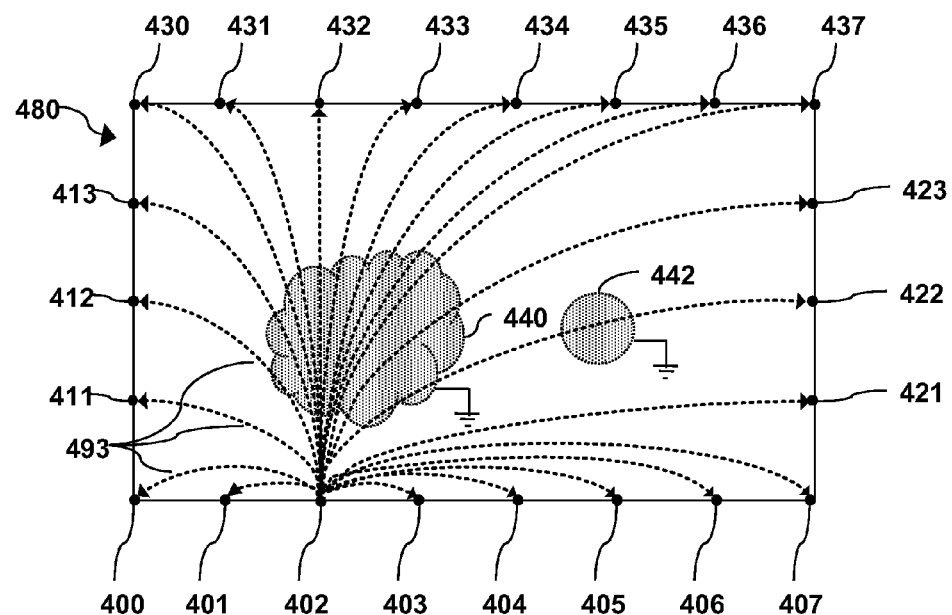

FIGS. 4-7 shows a rectangular sensor electrode 480 in accordance with embodiments of the invention. FIGS. 4-7 illustrates two different transmission and reception configurations that may be used to detect input in a sensing region of sensor electrode 480, FIGS. 4-5 show the two transmission and reception configurations with no input present, and FIGS. 6-7 show the same two transmission and reception configurations with inputs 440 and 442 in the sensing region.

As shown in FIGS. 4-7, sensor electrode 480 is connected to a plurality of circuitry portions of sensing circuitry at a plurality of connection locations 400-407, 411-413, 421-423, and 430-437. These connection locations are situated in proximity to edges of sensor electrode 480, and are evenly distributed along those edges. The plurality of connection locations 400-407, 411-413, 421-423, and 430-437 comprise four connection locations 400, 404, 470, and 474 that are located proximate to corners of sensor electrode 480.

FIG. 4 shows a first transmit-and-receive configuration where appropriate circuitry portions of the sensor circuitry (not shown) connected to sensor electrode 480 are operated to transmit a transmitter signal into sensor electrode 480 at the connection location 401, and also to receive resulting signals from sensor electrode 480 at multiple connection locations of the plurality of connection locations 400-407, 411-413, 421-423, and 430-437. The resulting signals include effects of the transmitter signal propagating through sensor electrode 480 to the multiple connection locations. Exemplary transmission paths 490 indicate example paths along which the transmitter signal may propagate through sensor electrode 480 from the connection location 401 to the connection locations 400-407, 411-413, 421-423, and 430-437.

FIG. 4 shows the multiple connection locations at which resulting signals are received as comprising all of the connection locations 400-407, 411-413, 421-423, and 430-437 (note that the connection location 401 both transmits and receives in this example). However, other embodiments may not receive resulting signals at one or more of the connection locations 401-407, 411-413, 421-423, and 430-437. For example, in some embodiments, every second or every third connection location may receive at one time. As another example, in some embodiments, the connection locations closest to a transmitting connection location do not receive, and this reduces the likelihood of circuit saturation. Thus, the multiple connection locations at which resulting signals are received may comprise any combination of the plurality of connection locations of a sensor electrode. These multiple connection locations may also form a subset or a full set of the plurality of connection locations of the sensor electrode.

FIG. 5 shows a second transmit-and-receive configuration where appropriate circuitry portions of the sensor circuitry are operated to transmit a transmitter signal into sensor electrode 480 at the connection location 402, and to receive resulting signals from sensor electrode 480 at multiple connection locations of the plurality of connection locations 400-407, 411-413, 421-423, and 430-437. Exemplary transmission paths 491 indicate example paths that the transmitter signal may propagate through sensor electrode 480 from the connection location 402 to the connection locations 400-407, 411-413, 421-423, and 430-437.

FIG. 5 shows the multiple connection locations at which resulting signals are received as comprising all of the connection locations 400-407, 411-413, 421-423, and 430-437. However, similar to the FIG. 4 example, the multiple connection locations at which resulting signals are received may comprise any single or combination of the plurality of connection locations 400-407, 411-413, 421-423, and 430-437 of sensor electrode 480.

During operation, the sensor circuitry may be operated such that the first transmit-and-receive configuration occurs during a first time period, and the second transmit-and-receive configuration occurs during a second time period different from the first time period.

Much like FIGS. 4-5, FIGS. 6-7 show sensor electrode 480 in the first and second transmit-and-receive configurations, respectively. However, in FIGS. 6-7, inputs 440 and 442 are in the sensing region of sensor electrode 480 and interact with the transmitter signals as they propagate through sensor electrode 480 (e.g. along exemplary transmission paths 492 or 493). This interaction affects the resulting signals received at least some of the connection locations 400-407, 411-413, 421-423, and 430-437.

FIGS. 4-7 show transmission schemes where a single transmitter signal is transmitted at a single connection location at a time. Other embodiments may have transmission schemes where multiple transmitter signals are transmitted at multiple connection locations simultaneously. FIGS. 4-7 also show reception schemes where multiple resulting signals are received at multiple connection locations simultaneously. Other embodiments may have reception schemes where single resulting signals are received at a single connection location at a time. Thus, various embodiments may have various transmit-and-receive configurations that comprise various numbers and locations of transmitter signal(s), transmission location(s), resulting signal(s), and reception locations. For example, some embodiments may transmit from single connection locations in turn, and receive from single or multiple connection locations at one time. As another example, some embodiments may transmit from multiple connection locations simultaneously, and receive from single or multiple connection locations at one time.

Further, identical or different transmitter signals may be transmitted from different connection locations during different time periods or simultaneously. For example, transmitter signals may differ in amplitude, frequency, phase, waveform shape, etc. The differences may be in accordance with one or more codes, such that the effects from different transmitter signals may be differentiated.

In addition, where a transmitter signal is periodic, multiple readings of the resulting signals may be obtained and averaged together or otherwise filtered to improve system performance (e.g. in greater accuracy, finer precision, improved noise rejection, etc.). Similarly, where a transmitter signal comprises a voltage waveform having rising and falling slopes and where charge or current related to the resulting signals are used as readings, then two readings of the resulting signal may be obtained (one on the rising slope and one on the falling slopes). This approach may also help improve system performance.

A sufficient set of readings of the resulting signals can be acquired with different transmit-and-receive configurations of a sensor electrode. This sufficient set of resulting signals can be used to produce a capacitive image of the sensing region of the electrode, where the capacitive image comprises at least one non-connection value associated with at least one non-connection section of the sensor electrode. That is, the resulting signals may be used to produce a capacitive image comprising pixel values. The pixel values are that of capacitive pixels corresponding to sections of the sensor electrode. At least one of the sections is a non-connection section, in which no connection locations to sensor circuitry are situated.

The capacitive image may be 1-D in that it only includes information about input(s) along one physical dimension (e.g. along a line). The capacitive image may be multi-dimensional. For example. The capacitive image may be 2-D and include information about input(s) along two physical dimensions (e.g. in a plane). The capacitive image may also be 3-D and include information about input(s) along three dimensions (e.g. in a space)

What constitutes a sufficient set of resulting signals, and what different transmit-and-receive configurations are adequate, varies from embodiment to embodiment. They depend on factors such as the resolution of the capacitive image, the shape of the sensor electrode, the number and locations of connection locations, the details of the transmit-and-receive configurations, and the like.

A general derivation for determining non-connection values is below, and the approach can be adapted to specific designs and configurations.

A particular transmit-and-receive configuration for a sensor electrode may be defined by a set of m and n values where m indicates the receive location and n indicates the transmit location (multiple m and/or n values are used where there are multiple receive locations and/or multiple transmit locations). For each relevant m and n combination, the applicable portion of the resulting signal ($U_{nm}$) (whatever is read of the resulting signal), may be modeled as follows. Specifically, $U_{nm}$ may be modeled as an integral along the relevant transmission path, $S_{nm}$ from n to m. This integral is of an "absorption factor", $A_{nm}(s)$, that varies along $S_{nm}$. This "absorption factor" of a location is a function of the capacitive coupling of that location on the sensor electrode to free space:

$$U_m^{(n)} = \int_{S_{nm}} A_{nm}(s)\,ds. \quad (1)$$

The total resulting signal (U) for a particular receive location may be estimated as the summation of all of the transmit locations:

$$U_m = \sum_n \int_{S_{nm}} A_{nm}(s)\,ds. \quad (2)$$

Where the system is defined with a set of corresponding capacitive pixels, Equations (1) and (2) may be simplified to produce a relationship to the centers of the capacitive pixels $P_{nm}$ along the path $S_{nm}$. Assuming that the parts of a capacitive pixel in the set $P_{nm}$ has equal weight for that capacitive pixel and using $A_{nm}(q)$ to indicate the absorption factor along the transmission path $S_{nm}$ to the $q^{th}$ capacitive pixel of $P_{nm}$, and using $S_{nm}(q)$ to indicate the distance to the $q^{th}$ capacitive pixel of $P_{nm}$, yields the following:

$$U_m^{(n)} = \sum A_{nm}(q)S_{nm}(q), \text{ and} \quad (3)$$

$$U_i = \sum_n \sum_{All\_q} A_{nm}(q)S_{nm}(q) \quad (4)$$

With a sufficient set of resulting signals, the set of associated equations (4) may be written in matrix form:

$$[U]=[S][A]. \quad (5)$$

Where [S] is not a square matrix, a pseudo inverse can be used to solve for [A].

$$[A]=[S^TS]^{-1}[S^T][U]. \quad (6)$$

[A] can then be used to derive information about the change in the capacitive coupling due to input in the sensing region, positional information about the input, etc.

[S] (and/or $[S^TS]^{-1}[S]$) can be obtained in any appropriate way, including through empirical methods, inductive methods, or combined empirical and inductive methods. For example, a sensor electrode may be measured to compile information about how changes in capacitive coupling to free space at different locations affect resulting signals. With sufficient data, [S] may be derived. As another example, a sensor electrode configuration may be electrically modeled to determine [S]. As a further example, [S] may be derived using both inductive models and empirical data, such as by using the empirical data to refine the inductive model.

In some cases, a linear sensing scheme used with a two-dimensional sensor electrode may be modeled with a set of resistors and a number of variable capacitors connected to ground. The capacitors have values which may be changed by proximity of input objects. This model can be expressed with finite differences.

The discussion below illustrates one example application of this model for the square sensor electrode 880 shown in FIG. 8. For clarity of explanation and to simplify the discussion, the system is configured with uniformly spaced sections, as indicated by the dashed lines. The twelve connection locations 800-803, 810, 813, 821, 823, 830-833 are located proximate to the edges of the sensor electrode 880 and are evenly spaced. The non-connection sections of the sensor electrode are evenly spaced similarly to connection locations 800-803, 810, 813, 821, 823, 830-833. The centers 811-812, 821-822 of these non-connection sections are indicated with the open circles. Sensor electrode 880 is configured to produce capacitive images comprising sets of values for sixteen uniformly laid out capacitive pixels. The centers of these capacitive pixels coincide with connection locations 800-803, 810, 813, 821, 823, 830-833, and with centers 811-812, 821-822 of the non-connection sections.

Also for clarity of explanation and to simplify the discussion, the following assumptions also apply for this example. First, sensor electrode 880 has substantially uniform resistance per square. (For example, sensor electrode 880 may comprise a sheet of ITO with constant thickness, cut into the proper shape). Second, a transmitter signal propagating through the sensor electrode is assumed to propagate primarily in the sensor electrode, and a negligible amount passes out of the sensor electrode into any input objects capacitively coupled to the sensor electrode. For example, if current or charge measurements comprise the readings acquired from the resulting signals, a negligible amount of current or charge passes out of the sensor electrode through any input objects interacting with the sensor electrode. Third, a linear sensing scheme is assumed, such that transmitter signals comprising voltage waveforms with linear rises or falls causes substantially linear responses in the readings taken from the resulting signals. This linear sensing scheme is also assumed to comprise transmitter signals with same constant-slope rises and/or falls for all transmissions. Assumptions such as these simplify the model in various functional aspects, such as in that the base-lining the resulting signals against the no-input object results can produce measurements proportional to the current propagating through the sensor electrode.

Figure 8:
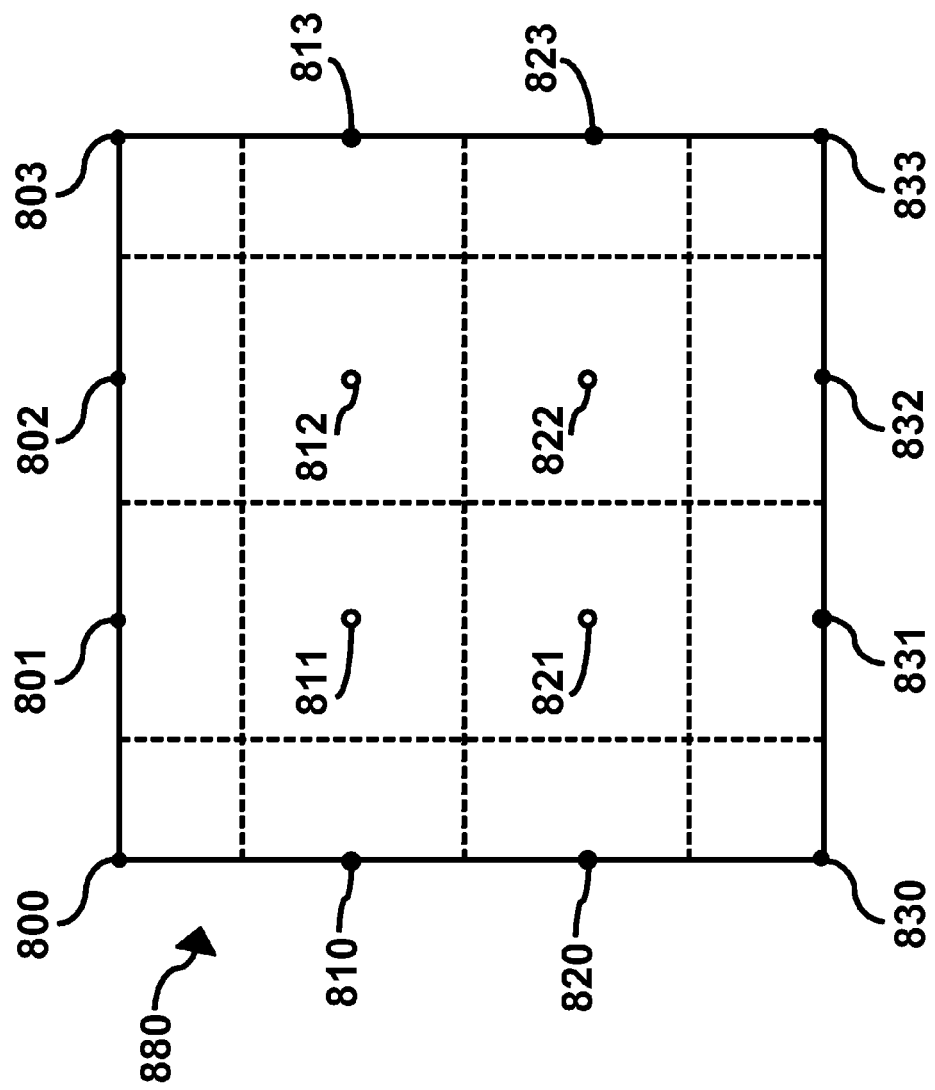
FIG. 8 is a top view of a square sensor electrode, in accordance with embodiments of the invention.
Figure 9:
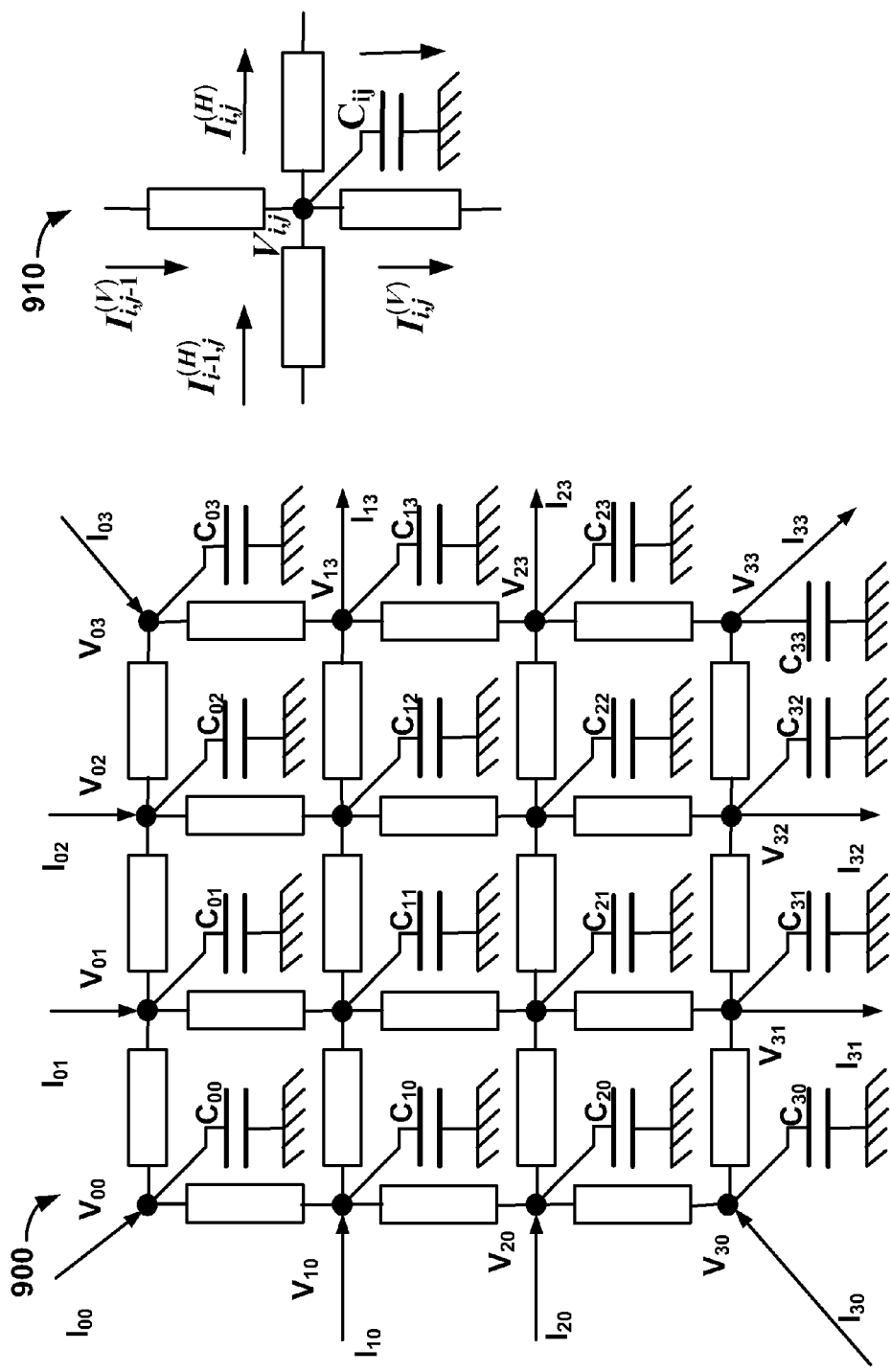
FIG. 9 is an electrical model of the square sensor electrode of FIG. 8, in accordance with embodiments of the invention.

The left side of FIG. 9 shows an electrical model 900 of the FIG. 8 example with the assumptions stated above, in accordance with embodiments of the invention. The electrical model comprises a set of equal resistances coupling sixteen electrical nodes together, and sixteen variable capacitors coupling the electrical nodes to ground. The resistances are shown as rectangles. The sixteen electrical nodes coincide with the centers of the sixteen capacitive pixels, and also coincide with connection locations 800-803, 810, 813, 820-823, 830-833, and with centers 811-812, 821-822 of the non-connection locations. To simplify FIG. 9, the nodes themselves and the resistors are not labeled. However, their locations have the same relative relationship as in FIG. 8. In total, the electrical model has twelve electrical nodes along the boundary of the set of nodes ("boundary nodes") and four electrical nodes in the interior of the set of nodes ("internal nodes."). With this model, solving for the value at a node provides information for the value at the coincident pixel.

The right side of FIG. 9 shows a key 910 that presents the terminology used in the model on the left side of FIG. 9. For example, the voltage at a node are indicated with the letter $V_{i,j}$ where the subscript i,j correspond to the last two digits of the node having the voltage. As another example, the variable capacitor coupled to a node are indicated in a similar way, using $C_{i,j}$ where the subscript i,j correspond to the last two digits of the node. I is used to indicate current, and the subscripts corresponds with how the current flows.

Since each of the connection locations 800-803, 810, 813, 820, 823, 830-833 is coupled to sensor circuitry, the voltage and current at each boundary node can be known when the associated connection location is driven or measured.

With the assumed linear sensing scheme and same linear waveforms with constant-slope rises and/or falls, the currents for each node of the network may be expressed as in Equation (7), where k is proportional to the slope of the drive voltage:

$$I_{ij}^{(H)} + I_{ij}^{(V)} = I_{i+1,j}^{(H)} + I_{i,j+1}^{(V)} + kC_{ij} \quad (7)$$

The resistance of each of the equal resistances is R. Thus, applying Ohm's law to Equation (7) means that it may be written as in Equation (8):

$$\frac{V_{i-1,j} - V_{i,j}}{R} + \frac{V_{i,j-1} - V_{i,j}}{R} = \frac{V_{i,j} - V_{i+1,j}}{R} + \frac{V_{i,j} - V_{i,j+1}}{R} + kC_{ij} \quad (8)$$

Equation (9) rewrites Equation (8) in a simpler form, where kR is equal to K:

$$(V_{i-1,j} - V_{i,j}) + (V_{i,j-1} - V_{i,j}) = (V_{i,j} - V_{i+1,j}) + (V_{i,j} - V_{i,j+1}) + KC_{ij} \quad (9)$$

Solving for $KC_{ij}$ yields Equation (10):

$$4V_{i,j} - V_{i-1,j} - V_{i,j-1} - V_{i+1,j} - V_{i,j+1} = KC_{ij} \quad (10)$$

Equation (10) may be solved to provide a reconstructed image. Writing Equation (10) for all of the nodes in matrix form results in a highly sparse matrix. This matrix is readily invertible.

The number of readings obtained from the system depends on how the nodes are driven and what is read from the resulting signals. For example, the sensing scheme may involve modulating the voltage at one connection location at a time (and transmit transmitter signals into the sensor electrode one boundary node at a time in the electrical model). The sensing scheme may further involve reading the current from the resulting signal for a transmitter signal for all connection locations, including the current injected from the transmitting connection location itself (and thus receive at all boundary nodes in the electrical model). With such a scheme, a set of 144 ($12^2$) readings may be taken after twelve time periods. The current may be read in any appropriate way.

With such a driving scheme, all of the boundary conditions are known (or knowable by evaluating the design and manufacture of the sensor device), all of the resistances are known (or knowable by evaluating the design and manufacture of the sensor device), and all of the currents injected into the driven nodes are known (from the readings). From these, the values associated with the internal nodes may be derived, which may be used to produce a two dimensional image.

The electrical current passing to the different nodes of the FIG. 9 model may be described by sixteen Equations (11):

$$I_{0,0} = I_{0,0}^{(H)} + I_{0,0}^{(V)} + kC_{0,0}$$

$$I_{0,1} + I_{0,0}^{(H)} = I_{0,1}^{(H)} + I_{0,1}^{(V)} + kC_{0,1}$$

$$I_{0,2} + I_{0,1}^{(H)} = I_{0,2}^{(H)} + I_{0,2}^{(V)} + kC_{0,2}$$

$$I_{0,3} + I_{0,2}^{(H)} = I_{0,3}^{(V)} + kC_{0,3}$$

$$I_{1,0} + I_{0,0}^{(V)} = I_{1,1}^{(H)} + I_{1,1}^{(V)} + kC_{1,1}$$

$$I_{1,1}^{(H)} + I_{0,2}^{(V)} = I_{1,2}^{(H)} + I_{1,2}^{(V)} + kC_{1,2}$$

$$I_{1,2}^{(H)} + I_{0,3}^{(V)} = I_{1,3} + I_{1,3}^{(V)} + kC_{1,3}$$

$$I_{2,0} + I_{1,0}^{(V)} = I_{2,0}^{(H)} + I_{2,0}^{(V)} + kC_{2,0}$$

$$I_{2,0}^{(H)} + I_{1,1}^{(V)} = I_{2,1}^{(H)} + I_{2,1}^{(V)} + I_{2,1}^{(V)} + kC_{2,1}$$

$$I_{2,1}^{(H)} + I_{1,2}^{(V)} = I_{2,2}^{(H)} + I_{2,2}^{(H)} + I_{2,2}^{(V)} + kC_{2,2}$$

$$I_{2,2}^{(H)} + I_{1,3}^{(V)} = I_{2,3} + I_{2,3}^{(V)} + kC_{2,3}$$

$$I_{3,0} + I_{2,0}^{(V)} = I_{3,0}^{(H)} + kC_{3,0}$$

$$I_{3,0}^{(H)} + I_{2,1}^{(V)} = I_{3,1}^{(H)} + I_{3,1} + kC_{3,1}$$

$$I_{3,1}^{(H)} + I_{2,2}^{(V)} = I_{3,2}^{(H)} + I_{3,2} + kC_{3,2}$$

$$I_{3,2}^{(H)} + I_{2,3}^{(V)} = I_{3,3} + kC_{3,3} \quad (11)$$

Adding the equal resistance value R and applying Ohm's law yields Equations (12):

$$I_{0,0} = \frac{V_{0,0} - V_{0,1}}{R} + \frac{V_{0,0} - V_{1,0}}{R} + kC_{0,0} \quad (12)$$

$$I_{0,1} + \frac{V_{0,0} - V_{0,1}}{R} = \frac{V_{0,1} - V_{0,2}}{R} + \frac{V_{0,1} - V_{1,1}}{R} + kC_{0,1}$$

$$I_{0,2} + \frac{V_{0,1} - V_{0,2}}{R} = \frac{V_{0,2} - V_{0,3}}{R} + \frac{V_{0,2} - V_{1,2}}{R} + kC_{0,2}$$

$$I_{0,3} + \frac{V_{0,2} - V_{0,3}}{R} = \frac{V_{0,3} - V_{1,3}}{R} + kC_{0,3}$$

$$I_{1,0} + \frac{V_{0,0} - V_{1,0}}{R} = \frac{V_{1,0} - V_{1,1}}{R} + \frac{V_{1,0} - V_{2,0}}{R} + kC_{1,0}$$

$$\frac{V_{1,0} - V_{1,1}}{R} + \frac{V_{0,1} - V_{1,1}}{R} = \frac{V_{1,1} - V_{1,2}}{R} + \frac{V_{1,1} - V_{2,1}}{R} + kC_{1,1}$$

$$\frac{V_{1,1} - V_{1,2}}{R} + \frac{V_{0,2} - V_{1,2}}{R} = \frac{V_{1,2} - V_{1,3}}{R} + \frac{V_{1,2} - V_{2,2}}{R} + kC_{1,2}$$

$$\frac{V_{1,2} - V_{1,3}}{R} + \frac{V_{0,3} - V_{1,3}}{R} = I_{1,3} + \frac{V_{1,3} - V_{2,3}}{R} + kC_{1,3}$$

$$I_{2,0} + \frac{V_{1,0} - V_{2,0}}{R} = \frac{V_{2,0} - V_{2,1}}{R} + \frac{V_{2,0} - V_{3,0}}{R} + kC_{2,0}$$

$$\frac{V_{2,0} - V_{2,1}}{R} + \frac{V_{1,1} - V_{2,1}}{R} = \frac{V_{2,1} - V_{2,2}}{R} + \frac{V_{2,1} - V_{3,1}}{R} + kC_{2,1}$$

$$\frac{V_{2,1} - V_{2,2}}{R} + \frac{V_{1,2} - V_{2,2}}{R} = \frac{V_{2,2} - V_{2,3}}{R} + \frac{V_{2,2} - V_{3,2}}{R} + kC_{2,2}$$

$$\frac{V_{2,2} - V_{2,3}}{R} + \frac{V_{1,3} - V_{2,3}}{R} = I_{2,3} + \frac{V_{2,3} - V_{3,3}}{R} + kC_{2,3}$$

$$I_{3,0} + \frac{V_{2,0} - V_{3,0}}{R} = \frac{V_{3,0} - V_{3,1}}{R} + kC_{3,0}$$

$$\frac{V_{3,0} - V_{3,1}}{R} + \frac{V_{2,1} - V_{3,1}}{R} = \frac{V_{3,1} - V_{3,2}}{R} + I_{3,1} + kC_{3,1}$$

$$\frac{V_{3,1} - V_{3,2}}{R} + \frac{V_{2,2} - V_{3,2}}{R} = \frac{V_{3,2} - V_{3,3}}{R} + I_{3,2} + kC_{3,2}$$

$$\frac{V_{3,2} - V_{3,3}}{R} + \frac{V_{2,3} - V_{3,3}}{R} = I_{3,3} + kC_{3,3}$$

Substituting $K \equiv Rk$, and taking into account that all the currents of the boundary nodes and all of the voltages at the boundary nodes are known in this example, Equations (12) may be rewritten as in Equations (13):

$$KC_{0,0} = RI_{0,0} - 2V_{0,1} + V_{1,0}$$

$$KC_{0,1} - V_{1,1} = RI_{0,1} - 3V_{0,1} + V_{0,0} + V_{0,2}$$

$$KC_{0,2} - V_{1,2} = RI_{0,2} - 3V_{0,2} + V_{0,3} + V_{0,1}$$

$$KC_{0,3} = RI_{0,3} - 2V_{0,3} + V_{0,2} + V_{1,3}$$

$$KC_{1,0} - V_{1,1} = RI_{1,0} - 3V_{1,0} + V_{2,0} + V_{0,0}$$

$$KC_{1,1} - V_{1,2} - V_{2,1} + 4V_{1,1} = V_{1,0} + V_{0,1}$$

$$KC_{1,2} - V_{2,2} - V_{1,1} + 4V_{1,2} = V_{0,2} + V_{1,3}$$

$$KC_{1,3} - V_{1,2} = RI_{1,3} - 3V_{1,3} + V_{2,3} + V_{0,3}$$

$$KC_{2,0} - V_{2,1} = RI_{2,0} - 3V_{2,0} + V_{3,0} + V_{1,0}$$

$$KC_{2,1} - V_{2,2} - V_{1,1} + 4V_{2,1} = V_{3,1} + V_{2,0}$$

$$KC_{2,2} - V_{2,1} - V_{1,2} + 4V_{2,2} = V_{2,3} + V_{3,2}$$

$$KC_{2,3} - V_{2,2} = -RI_{2,3} - 3V_{2,3} + V_{3,3} + V_{1,3}$$

$$KC_{3,0} = RI_{3,0} - 2V_{3,0} + V_{2,0} + V_{3,1}$$

$$KC_{3,1}-V_{2,1}=-RI_{3,1}-3V_{3,1}+V_{3,2}+V_{3,0}$$

$$KC_{3,2}-V_{2,2}=-RI_{3,2}-3V_{3,2}+V_{3,3}+V_{3,1}$$

$$KC_{3,3}=-RI_{3,3}-2V_{3,3}+V_{3,2}+V_{2,3} \quad (13)$$

This set of Equations (13) may be solved to obtain an image including values for the internal nodes where no direct measurements are taken.

Excluding the directly measurable corner capacitances in Equations (13) results in the following Equations (14):

$$KC_{0,1}-V_{1,1}=RI_{0,1}-3V_{0,1}+V_{0,0}+V_{0,2}$$

$$KC_{0,2}-V_{1,2}=RI_{0,2}-3V_{0,2}+V_{0,3}+V_{0,1}$$

$$KC_{1,0}-V_{1,1}=RI_{1,0}-3V_{1,0}+V_{2,0}+V_{0,0}$$

$$KC_{1,1}-V_{1,2}-V_{2,1}+4V_{1,1}=V_{1,0}+V_{0,1}$$

$$KC_{1,2}-V_{2,2}-V_{1,1}+4V_{1,2}=V_{0,2}+V_{1,3}$$

$$KC_{1,3}-V_{1,2}=RI_{1,3}-3V_{1,3}+V_{2,3}+V_{0,3}$$

$$KC_{2,0}-V_{2,1}=RI_{2,0}-3V_{2,0}+V_{3,0}+V_{1,0}$$

$$KC_{2,1}-V_{2,2}-V_{1,1}+4V_{2,1}=V_{3,1}+V_{2,0}$$

$$KC_{2,2}-V_{2,1}-V_{1,2}+4V_{2,2}=V_{2,3}+V_{3,2}$$

$$KC_{2,3}-V_{2,2}=-RI_{2,3}-3V_{2,3}+V_{3,3}+V_{1,3}$$

$$KC_{3,1}-V_{2,1}=-RI_{3,1}-3V_{3,1}+V_{3,2}+V_{3,0}$$

$$KC_{3,2}-V_{2,2}=-RI_{3,2}-3V_{3,2}+V_{3,3}+V_{3,1} \quad (14)$$

The matrix format of Equations (14) is below:

$$\begin{bmatrix} 1 & & & & & & & & & & -1 & 0 & 0 & 0 \\ & 1 & & & & & & & & & 0 & -1 & 0 & 0 \\ & & 1 & & & & & & & 0 & -1 & 0 & 0 & 0 \\ & & & 1 & & & & & & & 4 & -1 & -1 & 0 \\ & & & & 1 & & & & & & -1 & 4 & 0 & 1 \\ & & & & & 1 & & & & & 0 & -1 & 0 & 0 \\ & & & & & & 1 & & & & 0 & 0 & -1 & 0 \\ & & & & & & & 1 & & & -1 & 0 & 4 & -1 \\ & & & & & & & & 1 & & 0 & -1 & -1 & 4 \\ 0 & & & & & & & & & 1 & 0 & 0 & 0 & -1 \\ & & & & & & & & & 1 & 0 & 0 & -1 & 0 \\ & & & & & & & & & & 1 & 0 & 0 & 0 & -1 \end{bmatrix}$$

$$\begin{bmatrix} KC_{0,1} \\ KC_{0,2} \\ KC_{1,0} \\ KC_{1,1} \\ KC_{1,2} \\ KC_{1,3} \\ KC_{2,0} \\ KC_{2,1} \\ KC_{2,2} \\ KC_{2,3} \\ KC_{3,1} \\ KC_{3,2} \\ V_{1,1} \\ V_{1,2} \\ V_{2,1} \\ V_{2,2} \end{bmatrix} = \begin{bmatrix} S_{0,1} \\ S_{0,2} \\ S_{1,0} \\ S_{1,1} \\ S_{1,2} \\ S_{1,3} \\ S_{2,0} \\ S_{2,1} \\ S_{2,2} \\ S_{2,3} \\ S_{3,1} \\ S_{3,2} \end{bmatrix}$$

Equations (14) show that, with this linear approach, there are N equations with N+M unknowns (N capacitances and M voltages). From this, the voltage unknowns can be eliminated to N−M equations with N unknowns (just the capacitance unknowns).

The solution may be obtained after pseudo-inverting the matrix above to obtain a demodulation matrix, and multiplying this demodulation matrix with a vector of the input provided by the transmitter signals. In various embodiments, the demodulation matrix is pre-calculated and stored in a memory of the processing system of the sensor device. This pre-calculation can be performed by the processing system itself, or by a system other than the processing system of the sensor device (e.g., by a host system, by a different system at design or manufacture, etc.). Remote determination of the demodulation matrix may help reduce the computation ability required of the sensor device's processing system. Regardless of where such pre-calculation is done, this pre-calculation can also improve the speed of response of the sensor system.

FIG. 10 shows an example processing system 1010, in accordance with embodiments of the invention. For example, processing system 1010 may be an implementation of processing system 110 of FIG. 1. Processing system 1010 may be configured to determine one or more non-connection values for a sensor electrode (not shown). Processing system 1010 comprises sensor circuitry 1020 configured to be coupled to the sensor electrode. Specifically, processing system 1010 includes a plurality of circuitry portions configured to be connected to the sensor electrode at a plurality of connection locations. Processing system 1010 also includes an imaging module 1030 that is configured to obtain resulting signals (e.g. obtain readings from the resulting signals) and produce capacitive images. Imaging module 1030 may be configured to operate the plurality of circuitry portions to transmit transmitter signals into the sensor electrode and receive resulting signals, and to produce capacitive images comprising at least one non-connection value using the resulting signals.

Imaging module 1030 may be further configured in any appropriate way for producing the capacitive images. For example, imaging module 1030 may include memory for storing the pre-calculated values or demodulation matrices as described above. As another example, imaging module 1030 may be configured for determining such values or demodulation matrices. As a further example, imaging module 1030 may be configured for the plurality of connection locations being located near a boundary of the sensor electrode and for at least one non-connection section being located in an interior of the sensor electrode. As yet another example, imaging module 1030 may be configured for the plurality of connection locations being uniformly or non-uniformly spaced (such as being more closely spaced near corners of the sensor electrode).

FIGS. 11-12 show example methods for producing capacitive images of a sensing region of a sensor electrode, in accordance with embodiments of the invention. These methods may be performed by sensor devices, their processing systems, parts of their processing systems, and the like. For example, these methods may be performed by sensor circuitry 1020 and imaging module 1030 of FIG. 10, working in conjunction with each other. As another example, these methods may be used with any of the sensor electrode examples shown or discussed in this document. In addition, although FIGS. 11-12 each show a particular set of processes in a particular flow, each process may comprise any number of sub-processes. Further, it should be understood that various methods in accordance with embodiments of the invention may comprise fewer or more processes than shown in FIG. 11 or FIG. 12. In addition, the processes (and sub-processes if applicable) may be taken in any appropriate order, and may differ from the order shown.

FIG. 11 shows an example method 1100. The sensor electrode comprises a plurality of connection sections and at least one non-connection section. The sensor electrode is connected to sensor circuitry at a plurality of connection locations located in a plurality of connection sections, and not in the non-connection section.

Method 1100 comprises a process 1100 of transmitting a transmitter signal into the sensor electrode at a connection location of the plurality of connection locations.

Method 1100 also comprises a process 1120 of receiving a plurality of resulting signals from the sensor electrode at multiple connection locations of the plurality of connection locations. This plurality of resulting signals includes effects of the transmitter signal transmitted by process 1100 propagating through the sensor electrode to the multiple connection locations. These multiple connection locations may or may not include the connection location at which the transmitter signal is transmitted by process 1100. These multiple connection locations may be a subset or a full set of the plurality of connection locations. Where method 1100 comprises additional transmit-and-receive processes, these multiple connection locations may be the same as or be different from the connection locations used for receipt for those additional transmit-and-receive processes.

Method 1100 further comprises a process 1130 of producing a capacitive image using the plurality of resulting signals, where the capacitive image comprises at least one non-connection value associated with the at least one non-connection section. The capacitive image may or may not comprise any connection values associated with the connection sections.

As discussed above, method 1100 may further comprise any number of processes. For example, in some embodiments, process 1130 comprises determining a plurality of connection values associated with the plurality of connection sections As another example, in some embodiments, the non-connection section is part of a plurality of non-connection sections of the sensor electrode, and the process 1130 comprises determining a plurality of connection values and determining a plurality of non-connection values. The plurality of non-connection values comprises the non-connection value called out explicitly in the process 1130. The plurality of connection values is associated with the plurality of connection sections of the sensor electrode; that is, at least one connection value of the plurality of connection values is for a connection section of the plurality of connection sections. The plurality of non-connection values is associated with the plurality of non-connection sections; that is, at least one connection value of the plurality of non-connection values is for a non-connection section of the plurality of connection sections. The plurality of connections values and the plurality of non-connection values may encompass at least two physical dimensions, such that they form a multi-dimensional capacitive image descriptive of the input over at least two physical dimensions. The non-connection values may be determined using the plurality of connection values.

In some embodiments in accordance with the invention, the plurality of non-connection sections and/or the plurality of connection sections is variable in number, size, shape, location, and/or the like. Thus, the resolution of the corresponding capacitive image may change locally or globally. This variability may be in response to one or more types of trigger events. Example trigger events include one or more characteristics of the plurality of resulting signals, information received from outside of the processing system (e.g. from a host system, a user, etc.), an operating state, and a determination made by the processing system.

Triggering characteristics of the plurality of resulting signals can include the presence or absence of a resulting signal at a connection location, a count of the number of resulting signals received, the reliability of a resulting signal received at a connection location, a count of the number of reliable resulting signals, etc. An absence (or presence) of a resulting signal at a connection location when a resulting signal should have been received (or should not have been received), or a lower (or higher) count of the number of received resulting signals may indicate some failure of the system. Such a response may point to bad electrical connections, crosstalk, broken sensor circuitry, mis-operating software, or some other type of operational failure.

A particular resulting signal may be deemed unreliable due to being out of range, noise, saturation of the circuit elements, outlier characteristics compared with historical input, etc. For example, in some embodiments, the currents at the boundary nodes that the controller is configured to measure might get very high. This is more likely for nodes closer to the node driven as a transmitter. Such high currents may cause clipped readings where the currents are out of the range of the sensing circuit, and potentially reduce the accuracy of the reconstructed image. In such cases, the controller may be configured to note the readings that are railing (or close to railing), and ignore some or all of those readings.

In such cases, if there are still a sufficient number of resulting signals, the system may still be able to produce a same resolution capacitive image. That is, some embodiments produce "over-determined" systems, with more equations than unknowns. As long as the number of equations is bigger than the number of unknowns, and there is still sufficient coverage of the sensing region, the image may be reconstructed. With such a system, if one or more of the resulting signals is not usable (or a whole plurality missing due to transmission failure), the system may still be able to produce a capacitive image having the same resolution. As appropriate, the demodulation matrix may be updated without the failing transmitters or receivers. The updated demodulation matrix may be determined by the system itself, or some processor external to the system and capable of communicating with the system. For example, a connection value may be determined for a faulty connection location using methods similar to those used to determine non-connection values if sufficient information is still obtained from the resulting signals. If an insufficient number of resulting signals result, the plurality of non-connection sections (and/or the plurality of connection sections) may be redefined (and any physical relationships such as demodulation matrices recalculated) to accommodate for the lower number of resulting signals. That is, the capacitive image resolution may be reduced locally or globally to accommodate the changed readings. In some embodiments, this type of variability constitutes part of error recovery or fail-safe operation.

Examples of information received from an external source include instructions to enter lower resolution modes, information about processing or communications bandwidth, information about the resolution of capacitive image needed, etc. The information may be direct and explicitly present data from which the system sets operating resolution. For example, the information may comprise explicit instructions to produce images of lower resolution, explicit data about bandwidth availability, or explicit numbers about required resolutions in particular regions (if those are the relevant characteristics). The information may be indirect and imply the data from which the system sets operating resolution. For example, the information may comprise instructions to enter low power mode (but say nothing about capacitive image resolution), indicate bandwidth availability through the amount of information that received from the external source in a period of time, or note what applications a host system may be running or an input object size that the host expects. For example, the system may infer that virtual buttons can enabled with lower resolution than handwriting recognition input, that sensing larger input objects often does not require as high resolution as sensing smaller input objects, etc.

Examples of operating states include low-power states, particular application states, and the like. The system may be configured such that it produces capacitive images of certain resolutions for particular operation states.

Examples of determinations made by the system include a determination inferred from information from an external or internal source. For example, the system may determine a proper operating state (e.g. entering low power after a period of time with no input sensed). As another example, the system may also determine a complexity of the capacitive image. An earlier capacitive image or the set of resulting signals may indicate that the capacitive image will probably have high local or global complexity, and the system can adjust the resolution of the capacitive image locally or globally to accommodate. Or, an earlier capacitive image or the set of resulting signals may enable the system to determine the number of input objects, the type of input object, or some other information about the input objects that may affect the capacitive image resolution. (e.g. under many operating conditions, the location of one input object can often be achieved with lower resolution capacitive images than the locations of multiple input objects simultaneously in the sensing region).

As another example of variations possible in method 1100, in some embodiments, method 1100 further comprises transmitting a second transmitter signal into the sensor electrode at a second connection location and receiving a second plurality of resulting signals from the sensor electrode at second multiple connection locations of the plurality of connection locations. The second transmitter signal may be transmitted at the same time, or at a different time, as transmitting the transmitter signal of process 1110. The second transmitter signal may have the same or different characteristics as the transmitter signal of process 1110. The second connection location at which the second transmitter signal is transmitted differs from the connection location from which the transmitter signal is transmitted (in process 1110). The second plurality of resulting signals includes effects of the second transmitter signal propagating through the sensor electrode to the second multiple connection locations. The second multiple connection locations may share none or all of the connection locations of the plurality of connection locations of process 1120. The second plurality of resulting signals may also be used in producing the capacitive image of process 1130.

In some embodiments, processes 1110 and 1120 occur during a first time period, and the transmitting of the second transmitter signal and the receiving of the second plurality of resulting signals both occur during a second time period different from the first time period. In some embodiments, method 1100 further comprises electrically floating, during the second time period, a connection location of the multiple connection locations at which the plurality of resulting signals is received during the first time period. That is, a connection location that is used to receive a resulting signal by process 1120 is electrically floated during the second time period. For example, some embodiments electrically float some connection locations sometimes as part of the sensing scheme, or for a lower resolution image. As another example, some embodiments electrically float the connection locations close to the transmission location to reduce the probability of sensor circuit saturation, and use the other connection locations for receiving resulting signals. Thus, as the transmission location changes, a connection location may switch from receiving resulting signals to electrically floating (assuming that it is not transmitting). In some embodiments, the second multiple connection locations comprise the connection location at which the transmitter signal is transmitted (in process 1110). That is, the connection location used to transmit (in process 1110) is used to receive during the second time period.

FIG. 12 shows a method 1200 for producing capacitive images of input in a sensing region of a sensor electrode, in accordance with embodiment of the invention. The sensor electrode comprises a plurality of connection locations connected to circuitry portions of sensor circuitry. Method 1200 comprises a process 1210 of, during a first time period, operating a first circuitry portion of the plurality of circuitry portions to transmit a first transmitter signal into the sensor electrode and operating the plurality of circuitry portions to receive a first plurality of resulting signals from the sensor electrode. The first plurality of resulting signals includes first effects of the first transmitter signal propagating through the sensor electrode. Method 1200 also comprises a process 1220 of, during a second time period, operating a second circuitry portion of the plurality of circuitry portions to transmit a second transmitter signal into the sensor electrode and operating the plurality of circuitry portions to receive a second plurality of resulting signals from the sensor electrode. The second plurality of resulting signals includes second effects of the second transmitter signal propagating through the sensor electrode. Method 1200 further comprises a process 1230 of producing a capacitive image using the first and second pluralities of resulting signals. The capacitive image comprises a non-connection value associated with a non-connection section of the sensor electrode.

As discussed above, method 1200 may further comprise any number of processes, sub-processes, and variations, including analogs of all of the examples described above in conjunction with method 1100.

Figure 13:
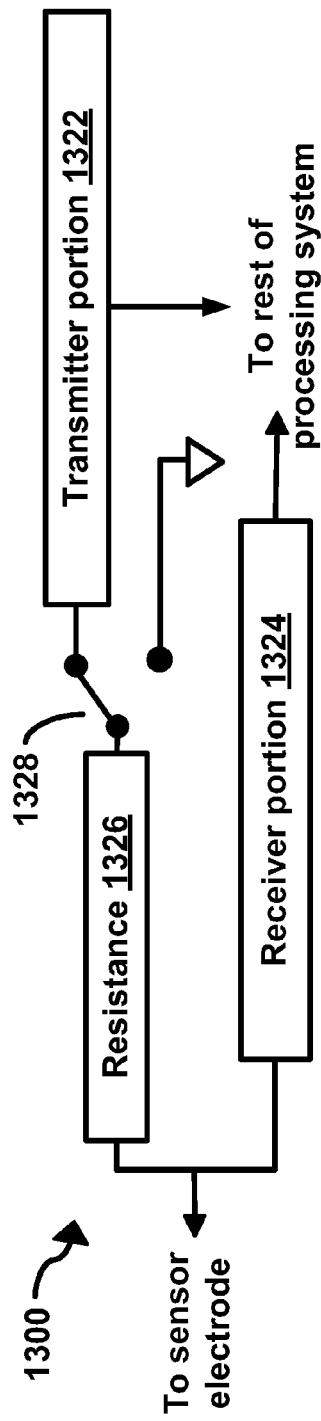
FIGS. 13-14 are block diagrams of example circuitry portions, in accordance with embodiments of the invention.
Figure 14:
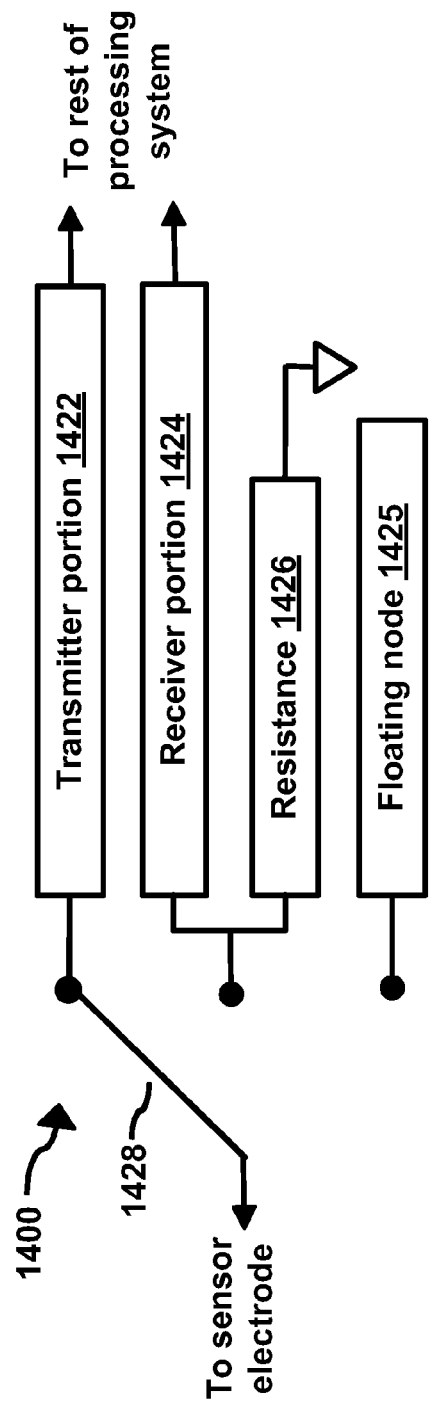

FIGS. 13-14 show some example circuitry portions, in accordance with embodiments of the invention. A circuitry portion connected to a connection location may be a dedicated transmitter (transmit or not), a dedicated receiver (receive or not), or something more complicated. For example, various circuitry portions may be able to switch between transmitting and receiving, between transmitting and floating, between receiving and floating, or among transmitting, receiving, and floating. As another example, a circuitry portion may be able to receive at the same time it transmits. Where dedicated transmitter or receiver portions are used, they may be interlaced in some way among the connection locations, such that some connection locations are connected only to transmitter portions and some connection locations are connected only to receiver portions. For example, the transmitter and receiver portions may alternate along a perimeter of a shape outlined by the connection locations. Where not all connection locations connected to a transmitter portion is also connected to a receiver portion, the number of connection locations capable of transmitting may be the same or be different from the number of connection locations capable of receiving. Where circuitry portions capable of both transmitting and receiving are used, there may be fewer connection locations as compared to where dedicated transmitter and receiver portions are used.

FIG. 13 shows a circuitry portion 1300 comprising a resistance 1326, a transmitter portion 1322, a receiver portion 1324, and a switch 1328. With the configuration of circuitry portion 1300, receiver portion 1324 is always connected to the sensor electrode. Thus, a connection location connected to the circuitry portion 1300 will always be receiving. Resistance 1326 is switchably coupled (via switch 1328) between the transmitter portion 1322 (for when transmitting transmitter signals) and system ground (for when not transmitting transmitter signals). Thus, the connection location connected to circuitry portion 1300 may or may not be transmitting at the same time it is receiving.

FIG. 14 shows a circuitry portion 1400, which comprises a transmitter portion 1422, a receiver portion 1424, a resistance 1426, a floating node 1425, and a switch 1428. With the configuration shown, a connection location connected to circuitry portion 1400 may be transmitting, receiving, or floating. Thus, the connection location connected to circuitry portion 1400 can not transmit at the same time it receives.

FIGS. 13-14 show only two example circuitry portion configurations, and many other types of circuitry portions are possible. As one example, some embodiments may comprise circuitry portions similar to circuitry portion 1300, but also include a third position for switch 1328 for electrically floating resistance 1326. As another example, some embodiments may comprise circuitry portions similar to circuitry portion 1400, but lack transmitter portion 1422, receiver portion 1424 and resistance 1426 to ground, or floating node 1425. As a further example, some other electric potential than system ground may be used.

Figure 15:
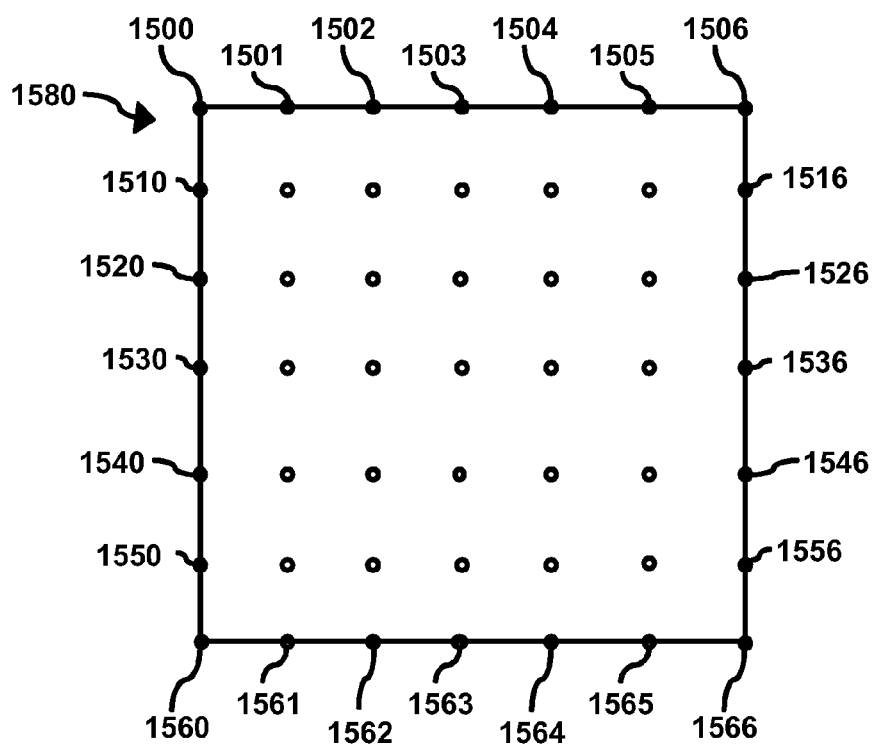
FIG. 15 is a top view of a sensor electrode 1580, in accordance with embodiments of the invention.

FIG. 15 shows a sensor electrode 1580 in accordance with embodiments of the invention, where the number of connection locations 1502, 1502, 1504, 1520, 1526, 1530, 1536, 1540, 1546, 1560, 1562, 1564, 1566 near edges of sensor electrode 1580 is fewer than the number of pixels located near the edges of sensor electrode 1580. Thus, sensor electrode 1580 illustrates that one or more pixels located near an edge of a sensor electrode may be calculated and not measured directly. The open circles indicate the centers of the non-connection sections of sensor electrode 1580, and the interior centers are not labeled. As can be seen, the centers 1501, 1503, 1505, 1510, 1516, 1530, 1536, 1550, 1556, 1561, 1563, 1565 are locate near the edges of sensor electrode 1580 and are not connection locations.

In terms of electrical topology, sensor electrode 1580 of FIG. 15 is the same as sensor electrode 880 of FIG. 8. The connection locations 1500, 1502, 1504, 1506, 1520, 1526, 1540, 1546, 1560, 1562, 1564, 1566 of the sensor electrode 1580 are in analogous locations as connection locations 800-803, 810, 813, 820, 823, and 830-833 of sensor electrode 880. However, the sensor device comprising sensor electrode 1580 is configured to generate a higher resolution image than the sensor device comprising the sensor electrode 880. That is, the sensor device comprising sensor electrode 1580 is configured for providing a 49 pixel capacitive image, where the centers of the pixels coincide with connection locations 1502, 1502, 1504, 1520, 1526, 1530, 1536, 1540, 1546, 1560, 1562, 1564, 1566 and centers 1501, 1503, 1505, 1510, 1516, 1530, 1536, 1550, 1556, 1561, 1563, 1565. This higher resolution capacitive image may be acquired where the sensing scheme generates sufficient resulting signals for determining the greater number of unknowns. Thus, sensor electrode 1580 may may not use the same sensing scheme as sensor electrode 880.

Sensor electrodes 880 and 1580 illustrate two example pixel layouts for a same sensor electrode. Other pixel layouts are possible. For example, there may be a different number of capacitive pixels. As another example, capacitive pixels may not be uniformly spaced, such that portions of the capacitive image have greater or lesser resolution than other portions. This may be the case even if the connection locations are uniformly laid out and the sensor electrode shape symmetric.

The figures discussed thus far have shown connection locations that are uniformly laid out along the edges of the sensor electrode. However, various embodiments may not have such characteristics. For example, some embodiments include connection locations that are inset from a physical perimeter of the sensor electrode; in some cases, this may facilitate connection to sensor circuitry, help reduce edge or corner effects due to the shape of the sensor electrode, etc. As another example, some embodiments include at least one connection location in an interior of the sensor electrode. This may be useful for improving the accuracy or resolution of parts of the capacitive image, for special applications (e.g. for virtual buttons to be enabled in the same area), and for other uses. This is even though such an interior connection location may be more challenging in some sensor due to considerations such as cross-talk and optics.

Figure 16:
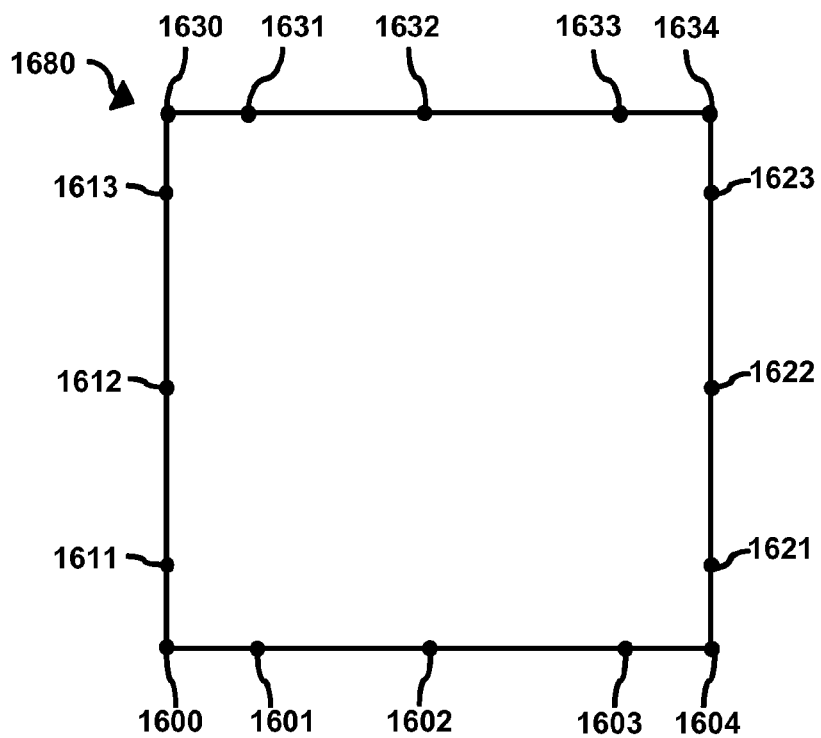
FIGS. 16-20 are top views of various sensor electrodes, in accordance with embodiments of the invention.
Figure 17:
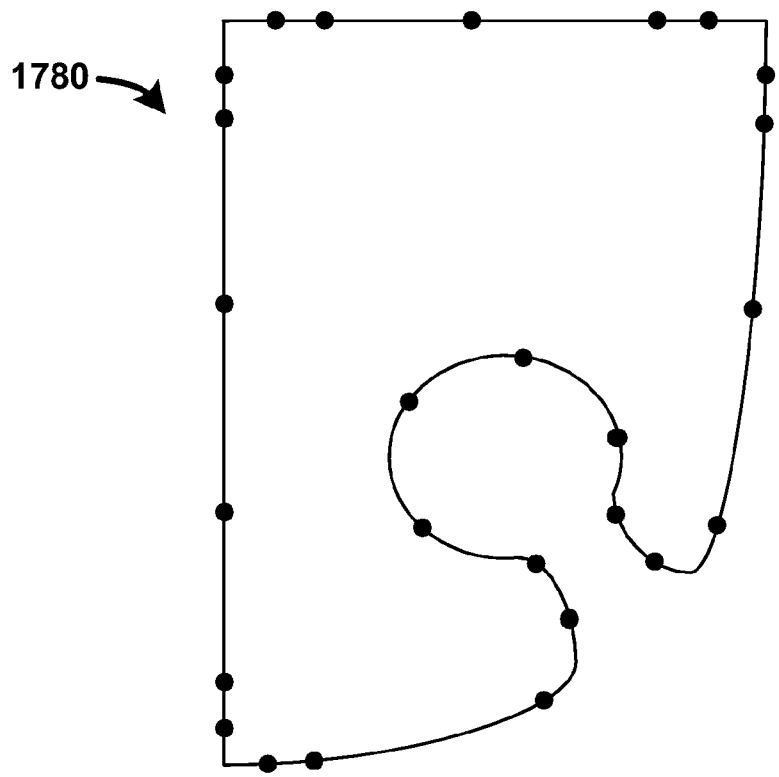
Figure 18:
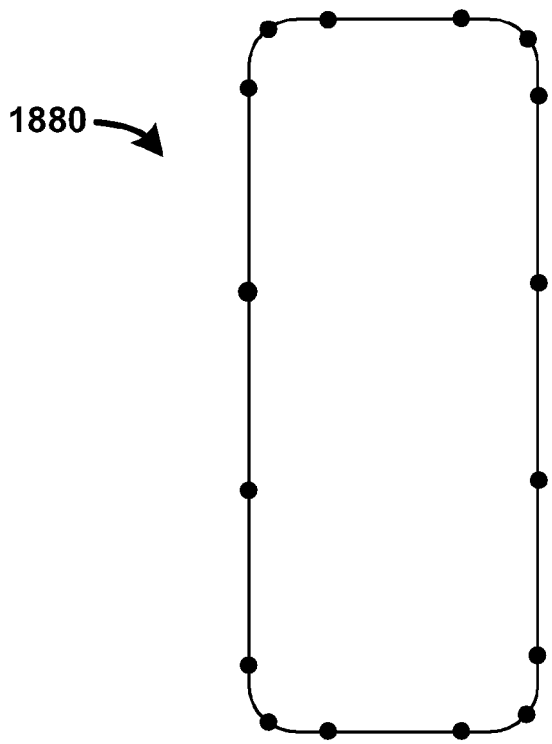

As yet another example, the sensor electrode may have connection locations that are not uniformly spaced. FIGS. 16-18 shows three such sensor electrode (1680, 1780, and 1880) with non-uniformly spaced connection locations. FIG. 16 shows a sensor electrode 1680 with connection locations 1600-1604, 1611-1613, 1621-1623, 1630-1634 that are spaced with adjacent connection locations by one of two distances. Specifically, the distance between the corner connection locations 1600, 1604, 1630, 1634, and their neighbors are shorter than those between the middle connection locations 1602, 1612, 1622, 1632 and their neighbors. Thus, connection location 1600 is closer to connection location 1601 than connection location 1601 is to connection location 1602. This layout locates a greater density of connection locations near the corners of sensor electrode 1680 than away from the corners of sensor electrode 1680, which may be useful in some implementations.

FIGS. 17-18 show sensor electrodes 1780 and 1880, for which connection locations are indicated by solid circles. The connection locations are also not uniformly spaced, and spaced more closely at some parts of the sensor electrode than other parts. FIG. 17 also show an example connection location layout where there is no connection location at one or more corners of the sensor electrode.

In some embodiments, the non-uniform spacing place denser connection locations in parts of the sensor electrode with greater shape complexity, where greater resolution is useful, where receiver portions are more likely to saturate, where there are fewer transmission paths or fewer different directions of transmission paths, and the etc. Greater shape complexity may arise where the sensor electrode has sharp curves, corners, and the like. Regions where greater resolution is useful may be determined by usage models of the sensor device (e.g. handwriting recognition areas may benefit from higher resolution than button input areas, if usage is geographically consistent for the sensor device). Receiver portions may be more likely to saturate closer to transmission locations or in particular parts of the sensor electrode that direct the transmission paths toward the receiver portions. There may be fewer transmission paths, or fewer different directions of transmission paths, in sharp curves or corners. Modeling or empirical studies may be used to determine proper connection location layout. As a specific example, some embodiments with rectilinear sensor electrodes may have denser couplings to sensor circuitry at corners. As another specific example, some embodiments may have edge portions with more densely packed boundary nodes than other edge portions.

Various embodiments in accordance with the invention have a wide variety of shapes of sensor electrodes. As examples, sensor electrodes in accordance with embodiments of the invention may comprise shapes including various concave or convex polygons, arcs or curves, etc. The shape of the sensor electrode can be reflected in the resulting signals, in the electrical model, in the demodulation matrices, and the like. Sensor electrodes 1780 and 1880 illustrate two example sensor electrodes shape that are not rectangles. Sensor electrode 1780 is quite non-rectangular, and sensor electrode 1880 is similar to a rectangle with rounded corners.

Sensor electrodes with non-uniform connection location layouts and/or non-rectangular shapes, such as sensor electrodes 1680, 1780, and 1880, may be used to generate capacitive images having uniform or non-uniform resolution.

Similarly, various embodiments of the invention may support capacitive pixels of various sizes and shapes. Although the pixels discussed thus far have largely been rectangular (and square for the examples of FIGS. 8, 9, and 15), various embodiments may have non-rectangular capacitive pixels of any appropriate shape. The different pixels can be reflected in the connection location layout, electrical model, in the demodulation matrices, and the like.

Figure 19:
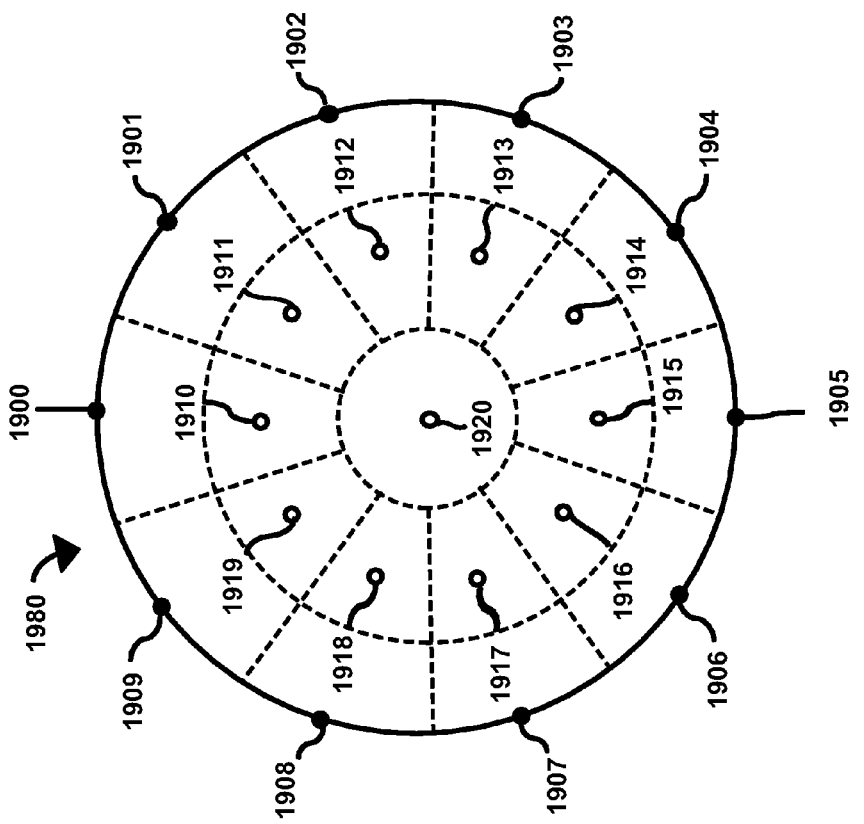

FIG. 19 show a sensor electrode 1980 with non-rectangular sections that are unequal in size and shape, as indicated by the dashed lines. These sections are circular or have the shape of truncated pie wedges. These non-rectangular sections correspond to non-rectangular pixels. The solid circles 1900-1909 indicate connection locations, and the open circles 1910-1920 indicate centers of unconnected sections. In this case, these centers coincide with the centers of the corresponding capacitive pixels.

Figure 20:
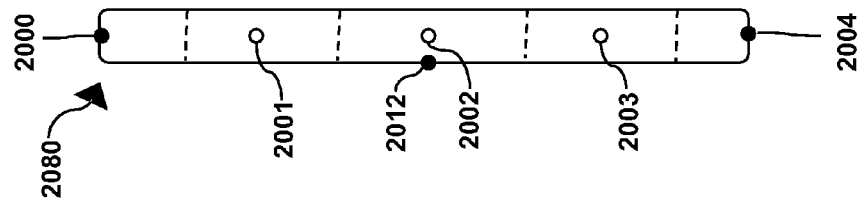

The figures discussed thus far have shown capacitive pixels that are coincident with connection locations are the centers of non-connection sections. However, various embodiments may have one or more capacitive pixels that are not thus coincident. FIG. 20 shows such an example. The sensor electrode 2080 is configured for a capacitive 1-D image that does not include a pixel center coincident with the connection location 2012. Specifically, the pixels centers coincide with the connection locations 2000, 2004, and the centers 2001, 2002, 2003 of the non-connection locations. The sensor device comprising sensor electrode 2080 is operated with a sensing scheme that enables the producing of this five-pixel, 1-D, capacitive image. Sensor electrode 2080 also illustrates that capacitive images produced in accordance with embodiments of the invention may be 1-D.

Thus, the embodiments and examples set forth herein were presented in order to explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

For example, in various embodiments, patterned conductive material may be located outside of, but near the edges or corners of the sensor electrodes. This may help reduce edge or corner effects. As another example, various sensor devices in accordance with embodiments of the invention may comprise one or more additional sensor electrode(s) which may or may not be operated to produce a capacitive image with at least one non-connection value. As a further example, sensor electrode in accordance with various embodiments may be non-planar in shape, and comprise any appropriate simple or complex 3D surface shape. As yet another example, sensor electrode in accordance with various embodiments may be operated to provide functionality other than capacitive imaging in the way described here. For example, the sensor electrode may comprise a common electrode of a display screen (e.g. a V-com electrode that exists in some LCDs or OLEDs).

What is claimed is:

1. A method for producing capacitive images of a sensing region of a sensor electrode, said sensor electrode comprising a plurality of connection sections and a non-connection section, wherein said sensor electrode is connected to sensor circuitry at a plurality of connection locations located in said plurality of connection sections and not said non-connection section, said method comprising:
  transmitting a transmitter signal into said sensor electrode at a connection location of said plurality of connection locations;
  receiving a plurality of resulting signals from said sensor electrode at multiple connection locations of said plurality of connection locations, wherein said plurality of resulting signals includes effects of said transmitter signal propagating through said sensor electrode to said multiple connection locations; and
  producing a capacitive image using said plurality of resulting signals, said capacitive image comprising a non-connection value associated with said non-connection section.

2. The method of claim 1, wherein said non-connection section is part of a plurality of non-connection sections of said sensor electrode, and wherein said producing said capacitive image comprises:
  determining a plurality of connection values associated with said plurality of connection sections of said sensor electrode; and
  determining a plurality of non-connection values associated with said plurality of non-connection sections of said sensor electrode, wherein said plurality of non-connection values comprises said non-connection value, and wherein said plurality of connections values and said plurality of non-connection values encompass at least two physical dimensions.

3. The method of claim 2, wherein said plurality of non-connection sections is variable based on at least one of: a characteristic of said plurality of resulting signals, information received from outside of said processing system, an operating state of said processing system, and a determination made by said processing system.

4. The method of claim 1, further comprising:
transmitting a second transmitter signal into said sensor electrode at a second connection location, said second connection location differing from said connection location; and
receiving a second plurality of resulting signals from said sensor electrode at second multiple connection locations of said plurality of connection locations, wherein said second plurality of resulting signals includes effects of said second transmitter signal propagating through said sensor electrode to said second multiple connection locations, and wherein said second plurality of resulting signals is utilized in said producing said capacitive image.

5. The method of claim 4, wherein said transmitting said transmitter signal and said receiving said plurality of resulting signals both occur during a first time period, and wherein said transmitting said second transmitter signal and said receiving said second plurality of resulting signals both occur during a second time period, said method further comprising:
during said second time period, electrically floating a connection location of said multiple connection locations at which said plurality of resulting signals is received during said first time period.

6. The method of claim 4, wherein said second multiple connection locations comprises said connection location at which said transmitter signal is transmitted.

7. A processing system configured to produce capacitive images of input in a sensing region of a sensor electrode, said processing system comprising:
a plurality of circuitry portions configured to be connected to said sensor electrode at a plurality of connection locations; and
an imaging module configured to:
during a first time period, operate a first circuitry portion of said plurality of circuitry portions to transmit a first transmitter signal into said sensor electrode and operate said plurality of circuitry portions to receive a first plurality of resulting signals from said sensor electrode, wherein said first plurality of resulting signals includes first effects of said first transmitter signal propagating through said sensor electrode,
during a second time period, operate a second circuitry portion of said plurality of circuitry portions to transmit a second transmitter signal into said sensor electrode and operate said plurality of circuitry portions to receive a second plurality of resulting signals from said sensor electrode, wherein said second plurality of resulting signals includes second effects of said second transmitter signal propagating through said sensor electrode, and
produce a capacitive image using said first and second pluralities of resulting signals, said capacitive image comprising a non-connection value associated with a non-connection section of said sensor electrode, wherein said sensor electrode is not connected to said plurality of circuitry portions in said non-connection section.

8. The processing system of claim 7, wherein imaging module is configured to produce said capacitive image using said first and second pluralities of resulting signals by:
determining a plurality of connection values associated with said plurality of connection sections of said sensor electrode; and
determining said non-connection value using said plurality of connection values.

9. The processing system of claim 8, wherein said plurality of non-connection sections is variable based on at least one of: a characteristic of said plurality of resulting signals, an information received from outside of said processing system, an operating state of said processing system, and a determination made by said processing system.

10. The processing system of claim 8, wherein said plurality of circuitry portions comprises at least one circuitry portion configured for both transmitting and receiving.

11. The processing system of claim 8, wherein said plurality of circuitry portions comprises at least one circuitry portion configured for receiving and at least one of transmitting and electrically floating.

12. The processing system of claim 8, wherein said imaging module is configured for said plurality of connection locations being located near a boundary of said sensor electrode, and wherein said imaging module is configured for said non-connection section being located in an interior of said sensor electrode.

13. The processing system of claim 8, wherein said imaging module is configured for said plurality of connection locations being uniformly spaced.

14. The processing system of claim 8, wherein said imaging module is configured for said plurality of connection sections being non-uniformly spaced.

15. The processing system of claim 14, wherein said imaging module is configured for said plurality of connection sections being more closely spaced near a corner of said sensor electrode.

16. The processing system of claim 7, wherein said non-connection section is part of a plurality of non-connection sections of said sensor electrode, wherein said plurality of connection locations are located in a plurality of connection sections of said sensor electrode, and wherein said imaging module is configured to produce said capacitive image using said first and second pluralities of resulting signals by:
determining a plurality of connection values associated with said plurality of connection sections; and
determining a plurality of non-connection values associated with said plurality of non-connection sections, wherein said plurality of non-connection values comprises said non-connection value, and wherein said plurality of connections values and said plurality of non-connection values encompass at least two physical dimensions.

17. A capacitive imaging sensor device comprising:
a sensor electrode having a sensing region, said sensor electrode configured to capacitively sense input in said sensing region; and
a processing system comprising a plurality of circuitry portions connected to said sensor electrode at a plurality of connection locations, said processing system configured to:
during a first time period, operate said plurality of circuitry portions to transmit a first transmitter signal into said sensor electrode at a first connection location and to receive a first plurality of resulting signals from said sensor electrode at a first plurality of connection locations, during a second time period, operate said plurality of circuitry portions to transmit a second transmitter signal into said sensor electrode at a second connection location different from said first connection location and to receive a second plurality of resulting signals from said sensor electrode at a second plurality of connection locations, and determine a capacitive image of said sensing region using said first and said second pluralities of resulting signals, said capacitive image spanning at least two physical dimensions and comprising a non-connection value associated with a non-connection section of said sensor electrode, wherein said electrode is not connected to said plurality of circuitry portions in said non-connection section.

18. The capacitive sensor device of claim 17, wherein said resulting signals include effects of said transmitter signal propagating through said sensor electrode, wherein capacitive sensor device is configured to sense particular input objects, and wherein said sensor electrode and said plurality of circuitry portions are configured such that variations in said effects are proportional to capacitance changes caused by said particular input objects.

19. The capacitive sensor device of claim 17, wherein said sensor electrode has a substantially uniform resistance per square.

20. The capacitive sensor device of claim 17, wherein said sensor electrode comprises a homogeneous conductive material.

21. The capacitive sensor device of claim 20, wherein said homogeneous conductive material comprises a metal oxide.

22. The capacitive sensor device of claim 17, wherein said sensor electrode comprises a non-homogeneous conductive material.

23. The capacitive sensor device of claim 22, wherein said non-homogenous conductive material is selected from said group consisting of a metal mesh, a set of nanofibers, a set of nanotubes, and graphene.

24. The capacitive sensor device of claim 17, wherein said sensor electrode is substantially transparent, wherein said plurality of connection locations are located near a boundary of said sensor electrode, and wherein said non-connection section is located in an interior of said sensor electrode, said capacitive sensor device further comprising:

a display screen configured to provide visual displays viewable through said sensor electrode.

25. The capacitive sensor device of claim 17, wherein said connection locations are located in a plurality of connection sections of said sensor electrode, and wherein said processing system is configured to determine said capacitive image of said sensing region using said first plurality of resulting signals and said second plurality of resulting signals by:

determining a plurality of connection values using said first plurality of resulting signals and said second plurality of resulting signals, said plurality of connection values corresponding to said plurality of connection sections; and determining said non-connection value using said plurality of connection values.

26. The capacitive sensor device of claim 17, wherein said plurality of circuitry portions comprises at least one circuitry portion configured for both transmitting and receiving.

27. The capacitive sensor device of claim 17, wherein said plurality of connection locations is more closely spaced near a corner of said sensor electrode.

* * * * *